(12) United States Patent
Kwak et al.

(10) Patent No.: US 10,775,869 B2
(45) Date of Patent: Sep. 15, 2020

(54) MOBILE TERMINAL INCLUDING DISPLAY AND METHOD OF OPERATING THE SAME

(71) Applicant: SAMSUNG ELECTRONICS CO., LTD., Suwon-si (KR)

(72) Inventors: Ji-yeon Kwak, Seoul (KR); Hyun-jin Kim, Seoul (KR); Yong-yeon Lee, Suwon-si (KR); Yeo-jun Yoon, Suwon-si (KR); Kyoung-jin Moon, Daegu (KR); Joon-kyu Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 14/335,068

(22) Filed: Jul. 18, 2014

(65) Prior Publication Data
US 2015/0022471 A1 Jan. 22, 2015

(30) Foreign Application Priority Data
Jul. 18, 2013 (KR) .................. 10-2013-0084931

(51) Int. Cl.
G06F 1/3234 (2019.01)
G06F 3/0488 (2013.01)
G06F 3/0481 (2013.01)

(52) U.S. Cl.
CPC .......... G06F 1/3265 (2013.01); G06F 1/3262 (2013.01); G06F 3/0481 (2013.01); G06F 3/0488 (2013.01); G06F 3/04883 (2013.01); Y02D 10/153 (2018.01)

(58) Field of Classification Search
CPC .. G06F 1/3265; G06F 1/3262; G06F 3/04883; Y02B 60/1242
USPC .................................. 345/173–178
See application file for complete search history.

(56) References Cited

U.S. PATENT DOCUMENTS

| 5,677,710 | A | * | 10/1997 | Thompson-Rohrlich ............ G06F 3/04883 345/173 |
|---|---|---|---|---|
| 7,003,308 | B1 | | 2/2006 | Fuoss et al. |
| 8,599,148 | B2 | | 12/2013 | Chung et al. |
| 9,215,306 | B2 | | 12/2015 | Kim et al. |

(Continued)

FOREIGN PATENT DOCUMENTS

| CN | 101557430 A | 10/2009 |
|---|---|---|
| CN | 101594403 A | 12/2009 |

(Continued)

OTHER PUBLICATIONS

Communication dated Nov. 26, 2014, issued by the International Searching Authority in counterpart International Application No. PCT/KR2014/006564.

(Continued)

*Primary Examiner* — Amit Chatly
(74) *Attorney, Agent, or Firm* — Sughrue Mion, PLLC

(57) ABSTRACT

Provided are a mobile terminal for providing a function performable by the mobile terminal to a user by using information input to the mobile terminal by the user, and a method of operating the mobile terminal. The method includes receiving a touch input while a touch sensor of the mobile terminal is activated and a display; determining an operation of the mobile terminal corresponding to the received touch input; and executing the determined operation when the display is activated.

9 Claims, 27 Drawing Sheets

RECEIVE TOUCH INPUT (S330)  ACTIVATE DISPLAY (S340)  DISPLAY INFORMATION WRITTEN BY USER (S350)

(56) References Cited

U.S. PATENT DOCUMENTS

| | | |
|---|---|---|
| 2009/0241072 A1 | 9/2009 | Chaudhri et al. |
| 2009/0256814 A1 | 10/2009 | Chung et al. |
| 2010/0321322 A1 | 12/2010 | Sohn |
| 2011/0163986 A1 | 7/2011 | Lee et al. |
| 2011/0223973 A1* | 9/2011 | Li .................. G06F 3/0346 455/564 |
| 2011/0273388 A1* | 11/2011 | Joo .................. G06F 3/0488 345/173 |
| 2011/0316797 A1* | 12/2011 | Johansson ........ G06F 3/04847 345/173 |
| 2012/0084691 A1 | 4/2012 | Yun |
| 2012/0184247 A1 | 7/2012 | Choe et al. |
| 2012/0235790 A1 | 9/2012 | Zhao et al. |
| 2012/0252539 A1* | 10/2012 | Hasegawa ........ G06F 3/04883 455/566 |
| 2013/0069897 A1* | 3/2013 | Liu .................. G06F 3/0488 345/173 |
| 2013/0076650 A1* | 3/2013 | Vik .................. G06F 3/0418 345/173 |
| 2013/0106748 A1* | 5/2013 | Hosaka .............. G06F 9/451 345/173 |
| 2013/0181941 A1* | 7/2013 | Okuno ................ G06F 3/041 345/174 |

FOREIGN PATENT DOCUMENTS

| | | |
|---|---|---|
| EP | 2472377 A2 | 7/2012 |
| KR | 10-2009-0012836 A | 2/2009 |
| KR | 10-2010-0136618 A | 12/2010 |
| KR | 10-2011-0024743 A | 3/2011 |
| KR | 10-2011-0068666 A | 6/2011 |
| KR | 10-2012-0071308 A | 7/2012 |
| KR | 10-2013-0028573 A | 3/2013 |
| KR | 10-2013-0031643 A | 3/2013 |

OTHER PUBLICATIONS

Communication dated Feb. 8, 2017, issued by the European Patent Office in counterpart European Application No. 14826564.8.
Communication dated Dec. 29, 2017, issued by the State Intellectual Property Office of the People's Republic of China in counterpart Chinese Patent Application No. 201480051756.7.
Communication dated Aug. 2, 2019, from the European Patent Office in counterpart European Application No. 19164266.9.
Communication dated Dec. 20, 2019 by the Indian Patent Office in counterpart Application No. 201627005122.

* cited by examiner

RECEIVE TOUCH INPUT
(S610)

DISPLAY SCREEN ACCORDING TO
RESULT OF CHARACTER
RECOGNITION (S620)

MOBILE TERMINAL INCLUDING DISPLAY AND METHOD OF OPERATING THE SAME

RELATED APPLICATIONS

This application claims the benefit of Korean Patent Application No. 10-2013-0084931, filed on Jul. 18, 2013, in the Korean Intellectual Property Office, the disclosure of which is incorporated herein in its entirety by reference.

BACKGROUND

1. Field

One or more exemplary embodiments relate to a mobile terminal including a display and a method of operating the same, and more particularly, to a mobile terminal that provides information to a user according to a user input in a state in which a display is deactivated, and a method of operating the mobile terminal.

2. Description of the Related Art

A mobile terminal is a device including at least one input device and at least one output device, and is portable. According to various functions of the mobile terminal, the mobile terminal is being realized in a form of a multimedia player having complex functions, such as photographing, content reproducing, game playing, broadcast receiving, and wireless Internet browsing. For example, recently, smartphones having various operating systems have been released. In order to realize such complex functions of the mobile terminal, various attempts have been made in terms of hardware or software.

Since a mobile terminal generally uses a battery as a power source, power consumption needs to be reduced. Accordingly, in order to reduce power consumption at a point of time when a mobile terminal is not used, many mobile terminals may deactivate some functions, such as operations of displays and application processors (APs). Generally, a state in which some functions are deactivated may be referred to as a sleep mode.

When a mobile terminal is in a sleep mode, a user may input separate information to the mobile terminal after releasing the sleep mode so as to use an input or output function of the mobile terminal. When a separate operation for releasing the sleep mode is required, the user is unable to immediately use the input or output function of the mobile terminal.

Also, the mobile terminal may include various sensors, such as a touch sensor, so as to provide various functions. From among various pieces of information that are input through the various sensors, information that is intentionally input by the user to obtain a desired result and information that is inadvertently input by the user need to be classified. The mobile terminal may perform different operations based on whether information is intentionally input through a sensor by the user.

SUMMARY

One or more exemplary embodiments include a mobile terminal that provides a function performable by the mobile terminal to a user by using information input to the mobile terminal by the user, and a method of operating the mobile terminal.

In addition, one or more exemplary embodiments include a mobile terminal that provides a function of the mobile terminal to a user based on whether information input to the mobile terminal through a sensor is information intentionally input by the user, and a method of operating the mobile terminal.

Additional aspects will be set forth in part in the description which follows and, in part, will be apparent from the description, or may be learned by practice of the presented embodiments.

According to one or more exemplary embodiments, a method of operating a mobile terminal including a touch sensor, the method includes receiving a touch input on the touch sensor in a state in which the touch sensor is activated and a display, which is configured to output information from the mobile terminal, is deactivated; and executing an operation of the mobile terminal corresponding to the received touch input when the display is activated.

The touch input may be an input received by the mobile terminal as the touch sensor recognizes at least two touches on the mobile terminal, and the operation of the mobile terminal corresponding to the received touch input may be determined based on a temporal interval between the at least two touches.

The executing of the mobile terminal may include: determining whether the touch input is recognizable as at least one character; and determining the operation of the mobile terminal based on a result of the determining.

The operation of the mobile terminal corresponding to the received touch input may be an operation of displaying a location or trace of the touch input on the display.

The executing of the operation of the mobile terminal may include: determining an application corresponding to the received touch input; and determining an operation of executing the application as the operation of the mobile terminal corresponding to the received touch input.

The determining of the application corresponding to the received touch input may include, when the touch input is recognized as at least one character, determining an application related to the at least one character as the application corresponding to the touch input, where the determining operation may be an operation of processing information about the at least one character by using the determined application.

The operation of the mobile terminal corresponding to the received touch input may be an operation of displaying an image generated correspondingly to the touch input by using the display.

The state in which the display is deactivated may include a state in which an application processor (AP) of the mobile terminal is deactivated, where the executing of the operation may further include activating the AP to execute the operation.

The executing of the operation of the mobile terminal may include, if there is an application being executed by an AP of the mobile terminal, controlling the application based on the touch input.

The method may further include obtaining an inclination about an inclination degree of the mobile terminal, wherein the operation of the mobile terminal corresponding to the received touch input may be determined based on the inclination and the received touch input.

According to one or more exemplary embodiments, a method of operating a mobile terminal, the method includes receiving a touch input of a user in a state in which a touch sensor of a touch screen is activated and a display is deactivated; and activating a partial region of the display based on the received touch input, wherein information is displayed on the activated partial region of the display.

A location and area of the partial region may be determined based on the touch input on the mobile terminal.

The touch sensor may detect a location of the touch input that is performed on the touch screen, and the partial region may be a region where the touch input is detected from among an entire region of the touch screen.

The touch sensor may be located on one side surface of the touch screen from the mobile terminal, and the activating of the partial region may include determining the partial region based on a location on the touch screen corresponding to a location of the touch input received through the touch sensor.

The activating of the partial region may include: determining at least one closed curve on the display based on the received touch input; and activating a region corresponding to an inside of the closed curve from an entire region of the display.

The activating of the partial region may include determining the partial region based on the number of times the touch input is received.

The display may be a flexible display of which a shape is transformable, and the activating of the partial region may include activating a region of the display of which the shape is not transformed.

The method may further include obtaining an inclination about an inclination degree of the mobile terminal, wherein the information displayed on the activated partial region may be determined based on the inclination and the received touch input.

The touch screen may be integral with the display.

According to one or more embodiments of the present invention, a mobile terminal includes a sensor including a touch sensor configured to receive a touch input; an outputter configured to output an image; and a controller configured to receive a touch input from the touch sensor in a state in which the touch sensor is activated and a display is deactivated, wherein the controller is configured to execute an operation of the mobile terminal corresponding to the received touch input when the display is activated.

The outputter may include the display.

The touch input may be an input received by the mobile terminal as the touch sensor recognizes at least two touches on the mobile terminal, and the controller may determine the operation of the mobile terminal according to a temporal interval between the at least two touches.

The controller may be configured to execute the operation of the mobile terminal corresponding to at least one character when the touch input is recognized as the at least one character.

The operation of the mobile terminal corresponding to the received touch input may be an operation of displaying a location or trace of the received touch input.

The operation of the mobile terminal corresponding to the received touch input may be an operation of executing an application corresponding to the received touch input.

When the touch input is recognized as at least one character, the controller may be configured to determine an application related to the at least one character, and processes information related to the at least one character by using the determined application.

The operation of the mobile terminal corresponding to the received touch input may be an operation of displaying an image generated corresponding to the touch input by using the outputter.

The state in which the display is deactivated may include a state in which an application processor (AP) of the mobile terminal is deactivated, where the controller may be configured to activate the AP to execute the operation of the mobile terminal corresponding to the received touch input as the display is activated.

The controller may include an AP, and if there is an application being executed by the AP, the controller may control the application based on the received touch input.

The mobile terminal may further include a tilt sensor for obtaining an inclination about an inclination degree of the mobile terminal, and the operation of the mobile terminal corresponding to the received touch input may be determined based on the inclination degree and the received touch input.

According to one or more exemplary embodiments, a mobile terminal includes a sensor including a touch sensor configured to receive a touch input; an outputter configure to output an image; and a controller configured to receive a touch input from the touch sensor in a state in which the touch sensor is activated and a display is deactivated, wherein the controller is configured to activate a partial region of the display based on the received touch input and displays information in the activated partial region.

The outputter may include the display.

A location and area of the partial region may be determined based on the touch input on the mobile terminal.

The touch sensor may be configured to detect a location of the touch input on the display, and the partial region may be a region where the touch input is detected from an entire area of the display.

The touch sensor may be located on one side surface of the display from the mobile terminal, and the controller may be configured to activate the partial region based on a location on the display corresponding to a location of the touch input received through the touch sensor.

The controller may be configured to determine at least one closed curve on the display based on the received touch input, and activate a region corresponding to an inside of the at least one closed curve from an entire region of the display.

The controller may be configured to determine the partial region based on the number of times the touch input is received.

The display may be a flexible display of which a shape is transformable, and the controller may activate a region of the display of which the shape is not transformed.

The mobile terminal may further include a tilt sensor for obtaining an inclination about an inclination degree of the mobile terminal, wherein the information displayed in the activated partial region may be determined based on the inclination degree.

According to one or more exemplary embodiments, a method of operating a mobile terminal including a touch screen includes: receiving a touch input on the touch screen in a state where a touch sensor of the touch screen is activated and a display of the touch screen is deactivated; and if there is an application being executed by an AP of the mobile terminal, controlling the application based on the received touch input.

According to one or more exemplary embodiments, a mobile terminal includes: a sensor unit including a touch sensor for receiving a touch input; an output unit including a display for outputting an image; and a controller that receives a touch input from the touch sensor in a state where the touch sensor is activated and the display is deactivated, wherein the controller includes an AP, and if there is an application being executed by the AP, the controller controls the application based on the received touch input.

According to one or more exemplary embodiments, a computer-readable recording medium has recorded thereon the method above.

According to one or more exemplary embodiments, a method of controlling a device includes receiving an input to a touch sensor of the device when the touch sensor is activated and a display is deactivated, activating the device, and executing an operation according to the input.

The touch sensor may be integral with the display.

The device may recognize the input according to a preset touch type.

According to one or more exemplary embodiments, a device includes a touch sensor configured to receive an input when the touch sensor is activated and a display is deactivated, and a controller configured to control the activation of the display, to determine a type of the input, and to execute an operation according to the input, where the display is activated after the controller determines the type of the input.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
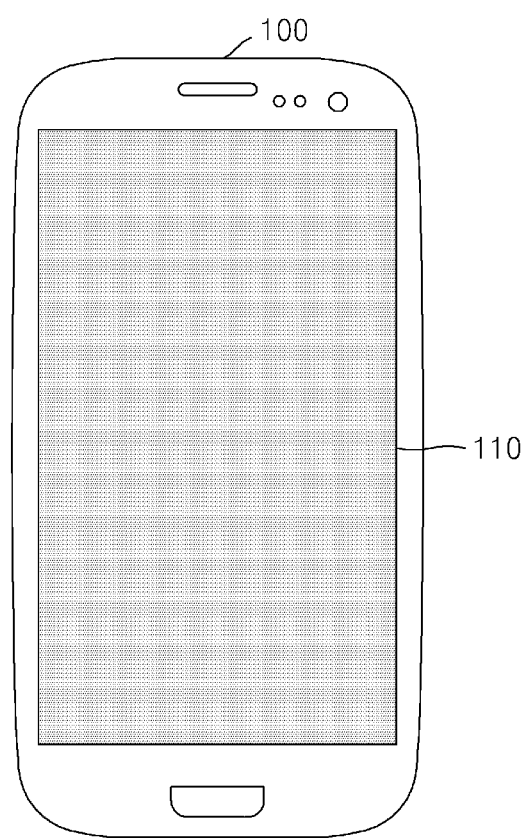
FIG. 1 is a diagram of a mobile terminal according to an exemplary embodiment.

Hereinafter, exemplary embodiments will be described more fully with reference to the accompanying drawings to be easily executed by one of ordinary skill in the art. This invention may be embodied, however, in many different forms and should not be construed as limited to the exemplary embodiments set forth herein. Rather, these embodiments are provided so that this disclosure will be thorough and complete, and will fully convey the scope of the invention to those skilled in the art. In drawings, elements irrelevant to description are not shown for clear description, and like elements denote like reference numerals throughout the specification.

In the specification, when a region is "connected" to another region, the regions may not only be "directly connected", but may also be "electrically connected" via another device therebetween. Also, when a region "includes" an element, the region may further include another element instead of excluding the other element, otherwise differently stated.

Also, when a part "includes" or "comprises" an element, unless there is a particular description contrary thereto, the part can further include other elements, not excluding the other elements. In the following description, terms such as "unit" and "module" indicate a unit for processing at least one function or operation. Hereinafter, the term "unit" refers to a software component, or a hardware component such as FPGA or ASIC, and performs a certain function. However, the "unit" is not limited to software or hardware. The "unit" may be configured in an addressable storage medium and may be configured to be executed by one or more processors. Hence, the "unit" includes elements such as software elements, object-oriented software elements, class elements, and task elements, and processes, functions, attributes, procedures, sub-routines, segments of program codes, drivers, firmware, micro-codes, circuits, data, databases, data structures, tables, arrays, and variables. The functions provided in the elements and the units may be combined into a fewer number of elements and units or may be divided into a larger number of elements and units.

Expressions such as "at least one of," when preceding a list of elements, modify the entire list of elements and do not modify the individual elements of the list.

Examples of a mobile terminal described herein include a mobile phone, a smartphone, a notebook computer, a digital broadcasting terminal, a personal digital assistant (PDA), a portable multimedia player (PMP), a camera, a navigation system, a tablet computer, and an e-book terminal, but are not limited thereto.

In the specification, a deactivated state of a display includes a state in which the display is not operable due to no power, and a state in which information is not displayed on the display, for example, only a black screen is output on the display. The deactivated state of the display may be referred to as a 'black screen' state. Also, a deactivated state of another device that is not the display may include a state in which the other device is not operating and a state in which the other device performs a minimum operation to reduce power consumption.

Hereinafter, one or more exemplary embodiments will be described in detail with reference to accompanying drawings.

FIG. 1 is a diagram of a mobile terminal 100 according to an exemplary embodiment.

The mobile terminal 100 may include a display 110. The display 110 is a device for visually outputting a process result of the mobile terminal 100. For example, the display 110 may visually output information, such as a user interface (UI) or an alarm message.

The display 110 may be configured in a form of a touch screen. In this case, the display 110 may include a touch screen panel and a touch screen panel control unit (i.e., touch screen panel controller). The touch screen panel is a transparent panel adhered outside a screen and may be connected to an internal bus of the mobile terminal 100. The touch screen panel receives a touch result, and, when a touch input is generated when a user touches the touch screen panel, transmits signals corresponding to the touch input to the touch screen panel control unit. The touch screen panel control unit may determine whether a touch input is generated by using the signals and determine a region of the touch screen where the touch input is generated.

Alternatively, the display 110 may be configured as an e-paper. An e-paper is a bendable display and is capable of recognizing an output result by using a reflected light. The e-paper has high resolution and a wide viewing angle.

Alternatively, the display 110 may be configured as a liquid crystal display (LCD), a light-emitting diode (LED) display, an organic light-emitting diode (OLED) display, a 3D display, or a plasma display panel (PDP). Alternatively, the display 110 may be configured not only as a panel having a fixed shape but also as a flexible display. As such, the display 110 may have any one of various shapes and is not limited to examples described herein. Also, the mobile terminal 100 may include a plurality of the displays 110.

Figure 15:
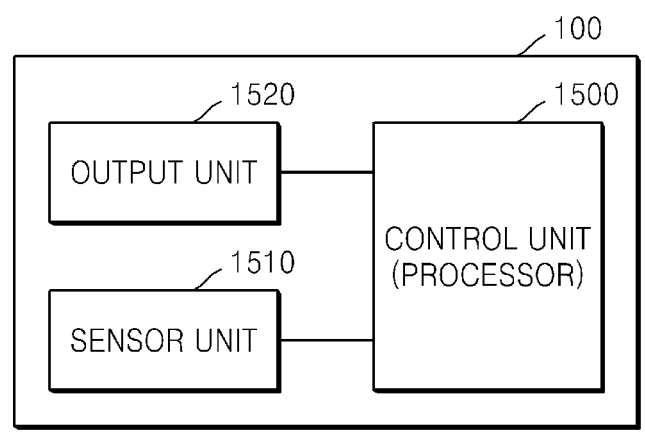
FIG. 15 is a block diagram illustrating a structure of a mobile terminal, according to an exemplary embodiment.

Although not shown in FIG. 1, the mobile terminal (i.e., device) 100 may include a sensor unit 1510 of FIG. 15. According to an exemplary embodiment, the sensor unit 1510 may include a touch sensor. When the display 110 is configured to include a touch screen, the touch sensor may be integrally formed with the display 110. Herein, a touch sensor is a sensor used to determine a touch and a touched location of an object on the mobile terminal 100.

Figure 2A:
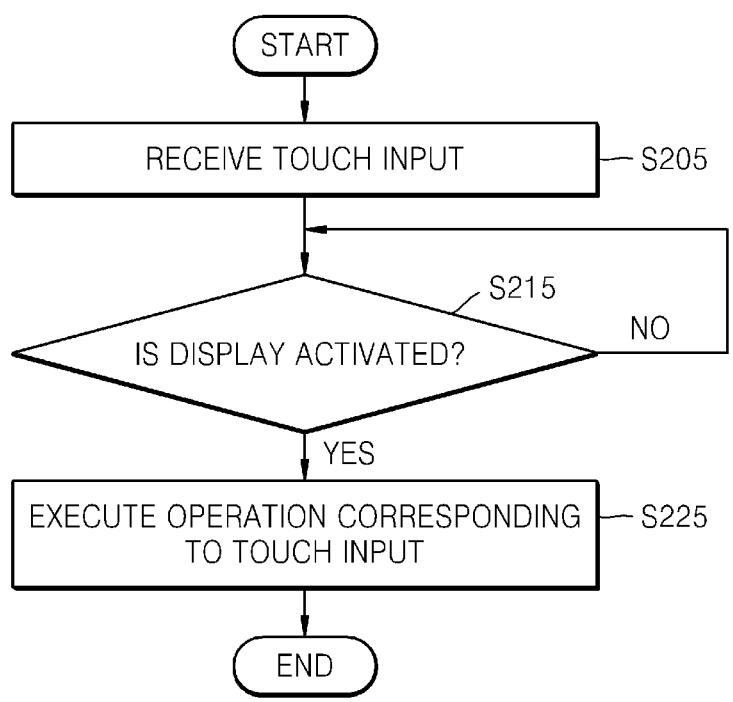
FIG. 2A is a flowchart of a method of operating a mobile terminal, according to an exemplary embodiment.

FIG. 2A is a flowchart of a method of operating the mobile terminal 100, according to an exemplary embodiment.

First, the mobile terminal 100 may receive a touch input from the sensor unit 1510, in operation S205. In operation S205, the display 110 of the mobile terminal 100 may be in a deactivated state, and the touch sensor may be in an activated state.

Next, the mobile terminal 100 may determine whether the display 110 is activated, in operation S215. In operation S225, if the display 110 is activated, the mobile terminal 100 may execute an operation corresponding to the touch input received in operation S205.

The operation of the mobile terminal 100 is a function or a combination of at least two functions which are able to be performed by the mobile terminal 100. For example, the operation of the mobile terminal 100 may be an operation of executing an application. Alternatively, the operation of the mobile terminal 100 may be an operation of displaying a result of processing a received input by the mobile terminal 100 on the display 110 included in the mobile terminal 100.

Figure 2B:
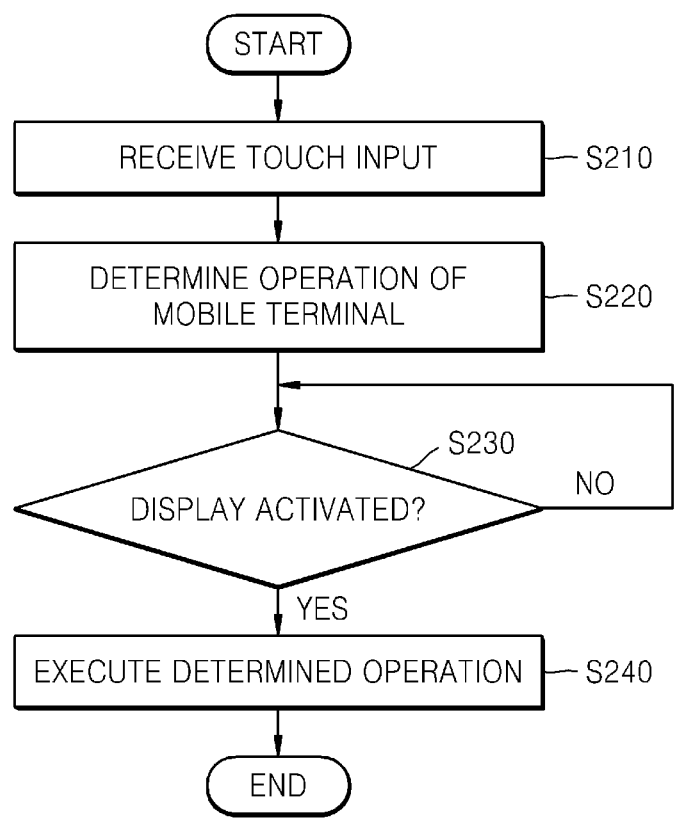
FIG. 2B is a flowchart of a method of operating a mobile terminal, according to another exemplary embodiment.

FIG. 2B is a flowchart of a method of operating the mobile terminal 100, according to another exemplary embodiment.

The mobile terminal 100 may receive input information from the sensor unit 1510. According to an exemplary embodiment, the mobile terminal 100 may receive a touch input from the touch sensor included in the sensor unit 1510, in operation S210. In operation S210, the display 110 of the mobile terminal 100 may be in a deactivated state and the touch sensor may be in an activated state.

Then, the mobile terminal 100 may determine an operation of the mobile terminal 100 corresponding to the received touch input, in operation S220. The operation of the mobile terminal 100 is a function or a combination of at least two functions which are able to be performed by the mobile terminal 100. For example, the operation of the mobile terminal 100 may be an operation of executing an application. Alternatively, the operation of the mobile terminal 100 may be an operation of displaying a result of processing an input received by the mobile terminal 100 on the display 110 included in the mobile terminal 100.

According to another exemplary embodiment, operation S220 may be performed together with operation S240. In other words, if it is determined that the display 110 of the mobile terminal 100 is activated in operation S230, the operation of the mobile terminal 100 may be determined. The mobile terminal 100 may then execute the determined operation in operation S240. In operation S240, if an application processor (AP) of the mobile terminal 100 is deactivated, the mobile terminal 100 may activate the AP. The mobile terminal 100 may perform operations S220 and S240 by using the activated AP.

The mobile terminal 100 may determine whether the display 110 is activated in operation S230. In operation S240, if the display 110 is activated, the mobile terminal 100 may execute the operation determined in operation S220.

For example, when the mobile terminal 100 includes a sleep mode button, a user may set the mobile terminal 100 in a sleep mode by using the sleep mode button. The display 110 of the mobile terminal 100 may maintain a deactivated state in the sleep mode. Then, when the user cancels the sleep mode of the mobile terminal 100 by using the sleep mode button, the mobile terminal 100 may activate the display 110. When the mobile terminal 100 activates the display 110, the mobile terminal 100 may output a result of the operation determined in operation S220 through the activated display 110. By executing the operation determined in operation S220, the mobile terminal 100 may output, for example, an execution screen of an application determined in operation S220, a UI, or an alarm message determined in operation S220.

According to an exemplary embodiment, the touch input may require at least two touches on the touch sensor. The mobile terminal 100 may determine the operation of the mobile terminal 100 in operation S220 based on a temporal interval between the at least two touches. For example, when the temporal interval is at least one second, the mobile terminal 100 may not perform a separate operation. On the other hand, when the temporal interval is less than one second, the mobile terminal 100 may execute a predetermined application according to the activation of the display 110 and output an execution screen of the predetermined application through the display 110. In other words, when the temporal interval is less than or equal to a pre-set value, it may be determined that the touch input by the user is intended to execute an application.

According to another exemplary embodiment, the operation of the mobile terminal 100, determined in operation S220, may be an operation of displaying a location or a trace of the received touch input while the display 110 is in a deactivated state. For example, if the user made a memo by the touch input on the deactivated display 110, the mobile terminal 100 may output the memo by displaying a trace of the touch input as the display 110, when the display 110 is activated.

Also, according to another exemplary embodiment, the AP of the mobile terminal 100 may be in a deactivated state in operation S210. In operation S240, the mobile terminal 100 may activate the AP to execute the operation determined in operation S220. A platform (hereinafter, referred to as a seamless sensing platform (SSP)) for managing operations of a sensor may operate separately from the AP in the mobile terminal 100 according to an exemplary embodiment. The mobile terminal 100 may connect a sensor hub of the SSP to a sensor unit. Accordingly, the mobile terminal 100 may collect input information from the sensor unit while the AP is in a deactivated state and recognize a situation. When a pre-set condition is satisfied, the SSP may activate the AP in a deactivated state. The SSP will be described in detail later with reference to FIG. 17.

Figure 3A:
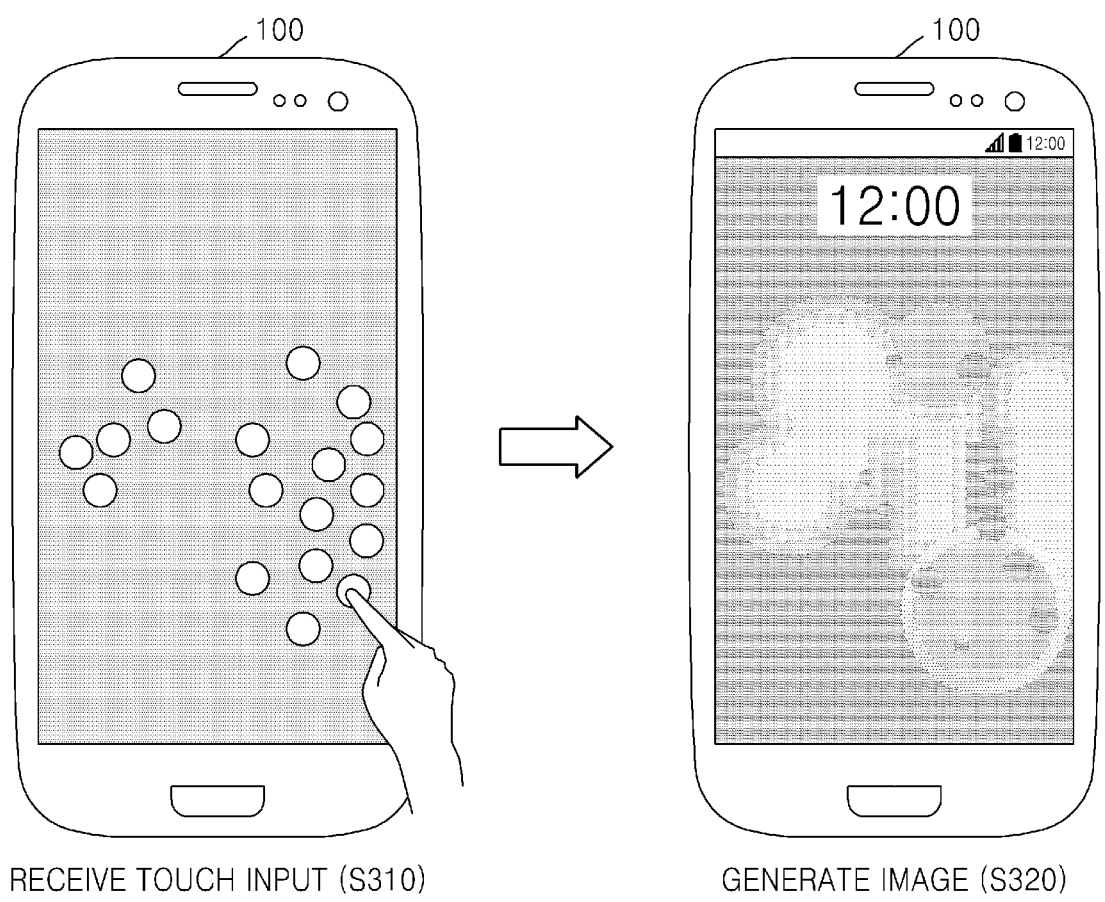
FIG. 3A is a diagram for describing operations of a mobile terminal, according to an exemplary embodiment.

FIG. 3A is a diagram for describing operations of the mobile terminal 100, according to an exemplary embodiment.

The mobile terminal 100 may receive a touch input in operation S310 while the display 110 is in a deactivated state. Then, the mobile terminal 100 may generate an image corresponding to a location where the touch input is received and output the generated image in operation S320.

For example, when the display 110 is configured as a touch screen and the mobile terminal 100 is in a sleep mode, the mobile terminal 100 may receive a touch input on one location of the display 110 touched by the user in the sleep mode. Then, as shown in operation S320, the mobile terminal 100 may output an image on the display 110 in which a color of the location touched by the user is changed.

The touch input may be classified into types, such as tap, drag, flick, circling, and surface touch, but is not limited thereto.

The mobile terminal 100 may recognize a touch of a body part or touch tool of the user by using the touch sensor. Hereinafter, for convenience of description, the body part of the user will be referred to as a finger.

A "tap" denotes an operation wherein the user touches the mobile terminal 100 by using a finger or touch tool (for example, an electric pen) and then immediately lifts the finger or touch tool from the mobile terminal 100 without moving the finger or touch tool on a screen of the display 110. When an input corresponding to a tap is received, the mobile terminal 100 may obtain a coordinate of a point touched by the finger or touch tool.

A "drag" denotes an operation wherein the user moves the finger or touch tool while touching a surface of the mobile terminal 100. When an input corresponding to a drag is received, the mobile terminal 100 may obtain information about a trace of a point touched by the finger or touch tool.

A "flick" is an operation wherein the user drags the finger or touch tool at a speed equal to or higher than a threshold value, for example, at 100 pixels/s. Drag and flick may be classified based on whether the finger or touch tool is moving at the speed equal to or higher than the threshold value. When an input corresponding to a flick is received, the mobile terminal 100 may obtain information about at least one of a direction and a speed that a touched coordinate moved.

A "circling" is an operation wherein the user makes a trace forming at least one closed curve by using the finger or touch tool. When an input corresponding to circling is received, the mobile terminal 100 may obtain information about a trace of a point touched by the finger or touch tool. Also, it may be determined whether a coordinate indicating a location on the surface of the mobile terminal 100 is inside or outside a closed curve.

A "surface touch" is an operation wherein the user touches the surface of the mobile terminal 100 in an area equal to or higher than a threshold value by using the finger or touch tool. When an input corresponding to a surface touch is received, the mobile terminal 100 may obtain information about a plurality of coordinates corresponding to the area touched by the finger or touch tool.

Figure 3B:
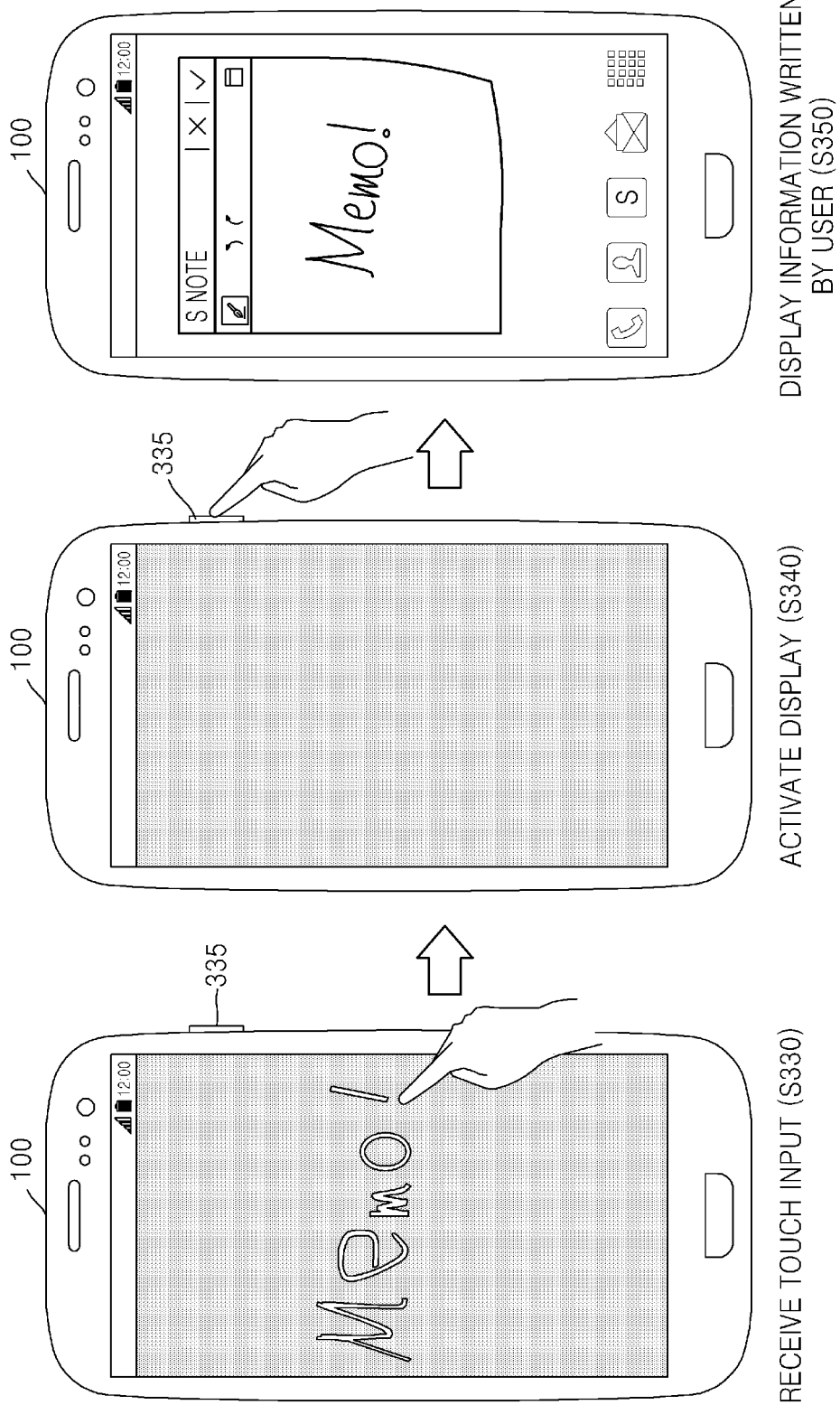
FIG. 3B is a diagram for describing operations of a mobile terminal, according to another exemplary embodiment.

FIG. 3B is a diagram for describing operations of the mobile terminal 100, according to another exemplary embodiment.

The mobile terminal 100 may receive a touch input when the display 110 is in a deactivated state, in operation S330. For example, a sleep mode for minimizing the number of functions operating in the mobile terminal 100 may be set in order to reduce power consumption. According to an exemplary embodiment, the mobile terminal 100 may include an SSP for controlling a sensor so as to receive an input, such as a touch input, in the sleep mode. The SSP will be described in detail with reference to FIG. 17.

When the user presses a sleep mode button 335, the display 110 of the mobile terminal 100 may be activated in operation S340. When the display 110 is activated, the mobile terminal 100 may display, in operation S350, information written by the user based on the touch input received in operation S330.

According to an exemplary embodiment, the mobile terminal 100 may display a trace of the touch input in operation S350. According to another exemplary embodiment, the mobile terminal 100 may perform, in operation S350, character recognition on the touch input received in operation S330. When the touch input is recognized as text, the mobile terminal 100 executes a memo-related application and outputs the recognized text by using the memo-related application.

Figure 4:
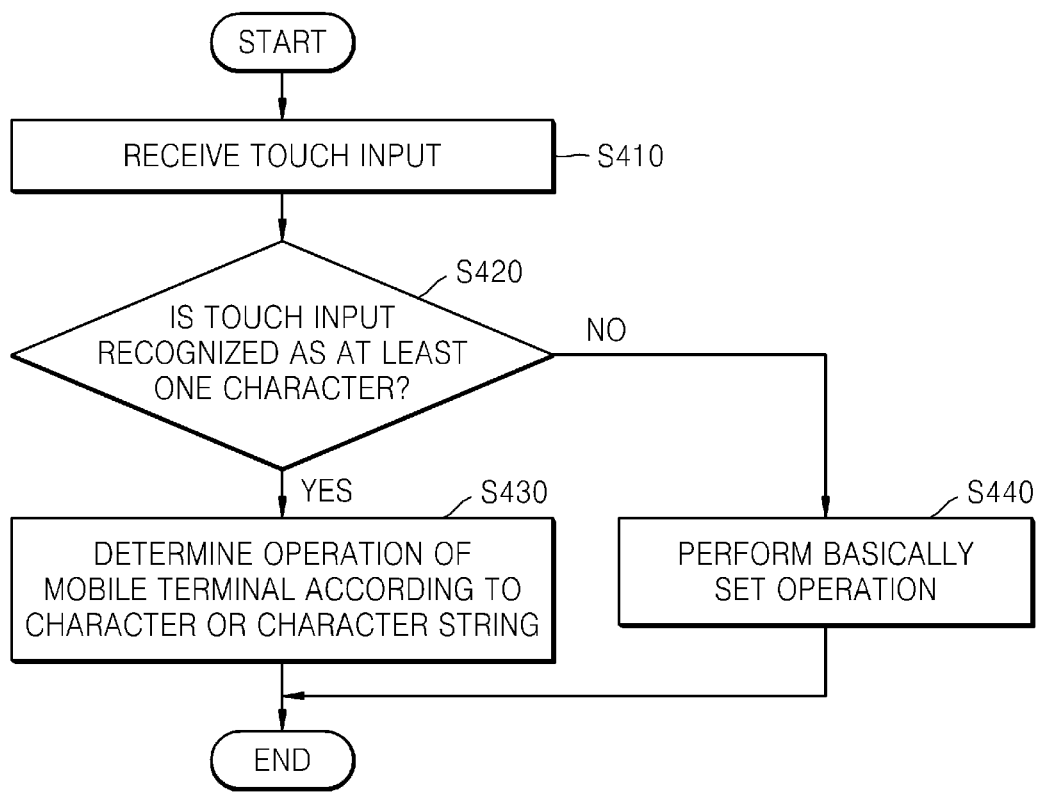
FIG. 4 is a flowchart of a process of a mobile terminal operating according to a result of character recognition based on touch recognition, according to an exemplary embodiment.

FIG. 4 is a flowchart of a process of the mobile terminal 100 operating according to a result of character recognition based on touch recognition, according to an exemplary embodiment.

According to an exemplary embodiment, the mobile terminal 100 receives a touch input in operation S410 and may perform character recognition on the received touch input. In the present specification, the character recognition is a function of switching input information to computer text by reading the input information. The character recognition may be realized via any one of various methods, such as structure analysis, feature matching, stroke analysis, and pattern matching.

When the touch input is recognized as at least one character in operation S420 by performing the character recognition, the mobile terminal 100 may determine an operation of the mobile terminal 100 based on the recognized at least one character or character string in operation S430. Otherwise, if the touch input is not recognized as at least one character in operation S420, the mobile terminal 100 may perform an operation that is pre-set in the mobile terminal 100 in operation S440. For example, when the touch input is recognized as a character string, the mobile terminal 100 may display the recognized character string on the display 110 when the display 110 is activated. On the other hand, when the touch input is not recognized as a character string, the mobile terminal 100 may perform an operation shown in FIG. 3A when the display 110 is activated.

Figure 5:
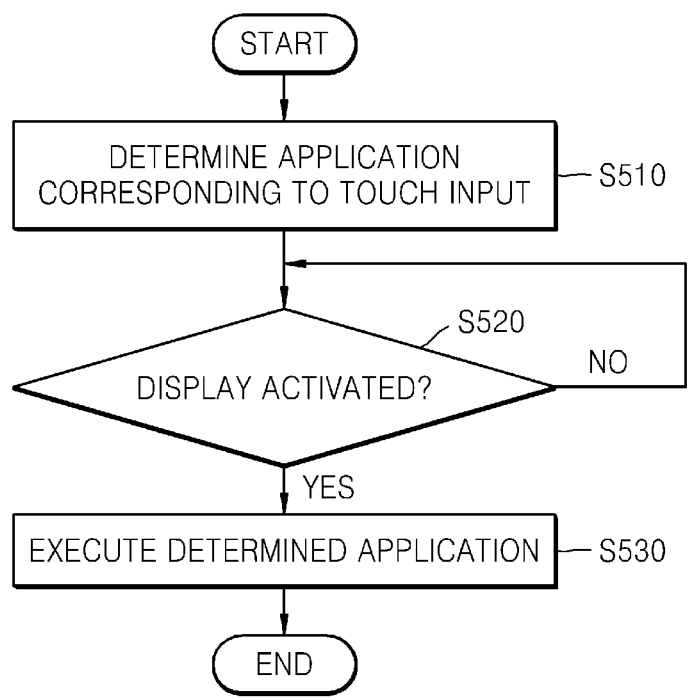
FIG. 5 is a flowchart of a process of a mobile terminal executing an application, according to an exemplary embodiment.

FIG. 5 is a flowchart of a process of the mobile terminal 100 executing an application, according to an exemplary embodiment.

In operation S510, the mobile terminal 100 may determine an operation corresponding to the touch input received in operation S210 of FIG. 2B. Here, the application corresponding to the touch input may execute an application according to an exemplary embodiment. For example, when the touch input is recognized as a character string, as in operation S420 of FIG. 4, an application corresponding to the touch input recognized as a character string may be determined to be a memo-related application.

The mobile terminal 100 may match and store the touch input and the application corresponding to the touch input. The touch input and the application corresponding to the touch input may be pre-set in the mobile terminal 100 or changed by the user. Alternatively, the touch input and the application corresponding to the touch input may be newly matched.

When the display 110 of the mobile terminal 100 is activated in operation S520, the application determined in operation S510 may be executed in operation S530. According to another embodiment, the mobile terminal 100 may activate the AP of the mobile terminal 100 together with the display 110 in operation S520 and perform operation S510 by using the activated AP. For example, in operation S510, when the touch input received is recognized as a character string, the mobile terminal 100 may execute a memo application and store the character string by using the memo application.

Figure 6A:
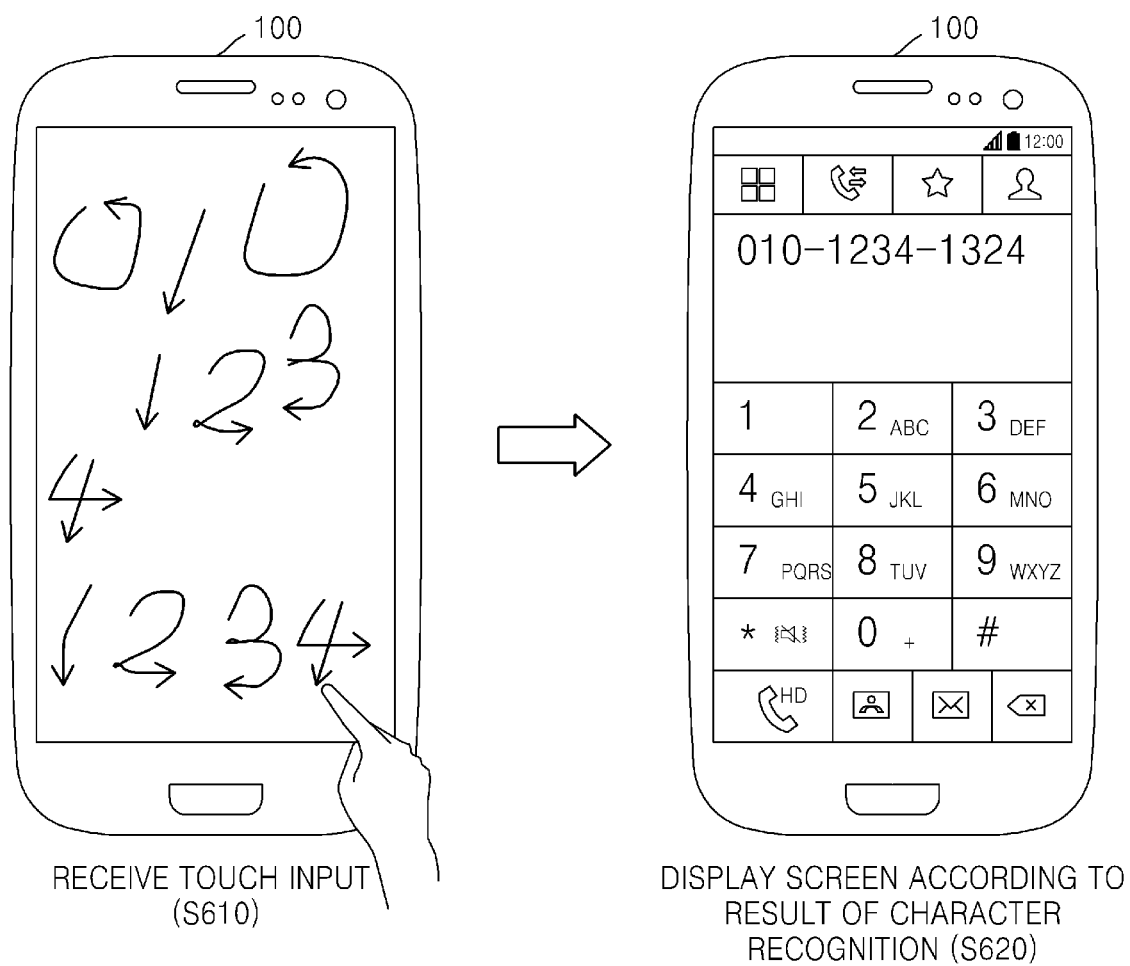
FIG. 6A is a diagram for describing operations of a mobile terminal executing an application, according to an exemplary embodiment.

FIG. 6A is a diagram for describing operations of the mobile terminal executing an application, according to an exemplary embodiment.

According to an exemplary embodiment, the mobile terminal 100 may receive a touch input by using the touch sensor in operation S610, when the display 110 is deactivated and the touch sensor is activated.

The mobile terminal 100 may perform character recognition on the received touch input. In operation S620, when the received touch input is recognized as at least one number, the mobile terminal 100 may execute a phone call-related application as an application corresponding to the touch input when the display 110 of the mobile terminal 100 is activated. The mobile terminal 100 may make a phone call or store a phone number by using the at least one number obtained via the character recognition and the executed phone call-related application. In operation S620, the mobile terminal 100 may display a UI for making a phone call or storing a phone number on the display 110. Alternatively, the mobile terminal 100 may make a phone call by using the executed phone-call related application and the at least one obtained number.

An application executed correspondingly to the touch input when the display 110 is activated may vary according to exemplary embodiments. For example, the mobile terminal 100 may execute a calculator application or an information search application.

According to another exemplary embodiment, the mobile terminal 100 does not have to execute a separate application. For example, when the received touch input is at least one drag input, the mobile terminal 100 may display a trace of the received touch input on the display 110 when the display 110 is activated. In another example, the mobile terminal 100 may display at least one character obtained via the character recognition on the received touch input on the display 110, when the display 110 is activated.

Figure 6B:
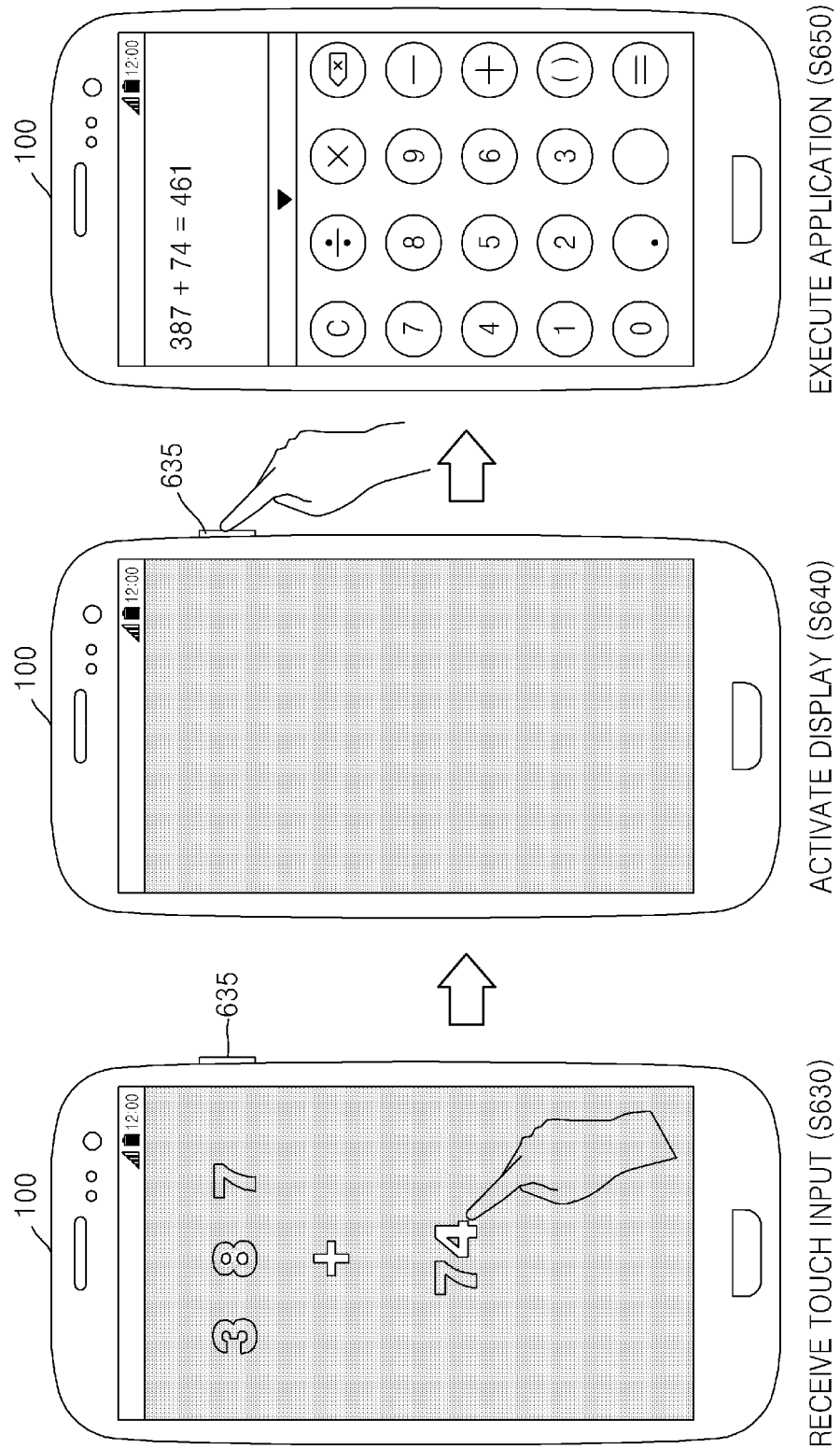
FIG. 6B is a diagram for describing operations of a mobile terminal executing an application, according to another exemplary embodiment.

FIG. 6B is a diagram for describing operations of the mobile terminal 100 executing an application, according to another exemplary embodiment.

According to an exemplary embodiment, the mobile terminal 100 may receive a touch input by using the touch sensor in a state in which the display 110 is deactivated and the touch sensor is activated, as shown in operation S630. The mobile terminal 100 may include a sleep mode button 635 and the user may set the mobile terminal 100 to a sleep mode by using the sleep mode button 635, placing the display 110 of the mobile terminal 100 in the deactivated state.

After performing operation S630, the mobile terminal 100 may activate the display 110 in operation S640 when the user presses the sleep mode button 635.

When the display 110 is activated, the mobile terminal 100 may perform character recognition on the received touch input. When the received touch input is recognized as at least one number and at least one mathematical sign, such as + or −, the mobile terminal 100 may execute a calculator application, as shown in operation S650, to calculate the at least one number. Also, the mobile terminal 100 may process information recognized from the received touch input by using the calculator application executed in operation S650. In other words, a result of calculating a recognized equation may be output.

One or more exemplary embodiments are not limited to those shown in drawings and may vary. For example, a calendar application may be executed based on whether a pre-set character, such as a number of recognized figures or 'month' and 'date', is recognized. Also, the mobile terminal may recognize a trace of a touch input instead of a character and perform an operation corresponding to the recognized trace. The trace of the touch input may be referred to as a gesture. For example, if the trace has a star shape, the mobile terminal 100 may transmit a message to a pre-set target. Alternatively, if the trace has a circular shape, the mobile terminal 100 may call a pre-set target.

Figure 7A:
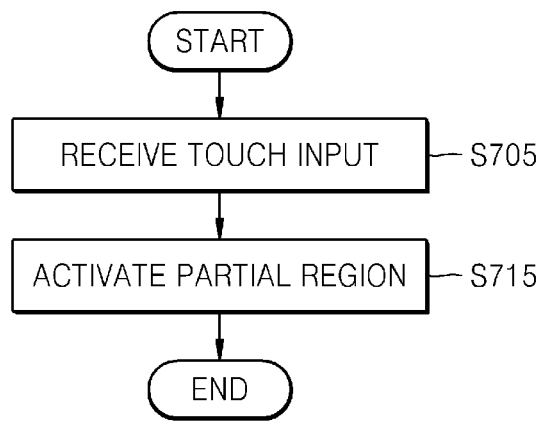
FIG. 7A is a flowchart of a process of the operation of a mobile terminal, according to an exemplary embodiment.

FIG. 7A is a flowchart of a process of the operation of the mobile terminal 100 according to an exemplary embodiment.

First, the mobile terminal 100 may receive input information from the sensor unit 1510. According to an exemplary embodiment, the mobile terminal 100 may receive a touch input from the touch sensor included in the sensor unit 1510, in operation S705. In operation S705, the display 110 of the mobile terminal 100 may be in a deactivated state and the touch sensor may be in an activated state.

According to an exemplary embodiment, the AP of the mobile terminal 100 may be in a deactivated state in operation S705. When the touch input received from the sensor unit 1510 satisfies a pre-set condition, the mobile terminal 100 may activate the AP.

Based on the touch input received in operation S705, the mobile terminal 100 may activate a partial region of an entire region of the display 110, in operation S715, and the mobile terminal 100 may display information on the activated partial region. In an exemplary embodiment, the activated partial region of the display 110 may be referred to as an information display region. The information display region is a virtual region determined by the mobile terminal 100 to display information on the display 110.

The information displayed on the partial region of the display 110 in operation S715 is information capable of being output by the mobile terminal 100 through the display 110. For example, arbitrary information, such as a missed call message, an alarm message, news information, an application execution icon, a widget, an application execution screen, an image, or text, may be displayed on the partial region of the display 110.

According to an exemplary embodiment, the mobile terminal 100 may use different methods of activating the partial region based on features of the display 110. For example, when it is not possible for the mobile terminal 100 to operate only the partial region of the display 110, the mobile terminal 100 may enable the display 110 to output a color indicating a deactivated state of the display 110 in a region of the display 110 excluding the partial region. For example, when the display 110 is black in the deactivated state, the mobile terminal 100 may output black in a region of the display 110 excluding the information display region. In another example, when the mobile terminal 100 is able to control only the partial region of the display 110 to be operated, the mobile terminal 100 may supply power only to a display device corresponding to the partial region of the display 110.

Figure 7B:
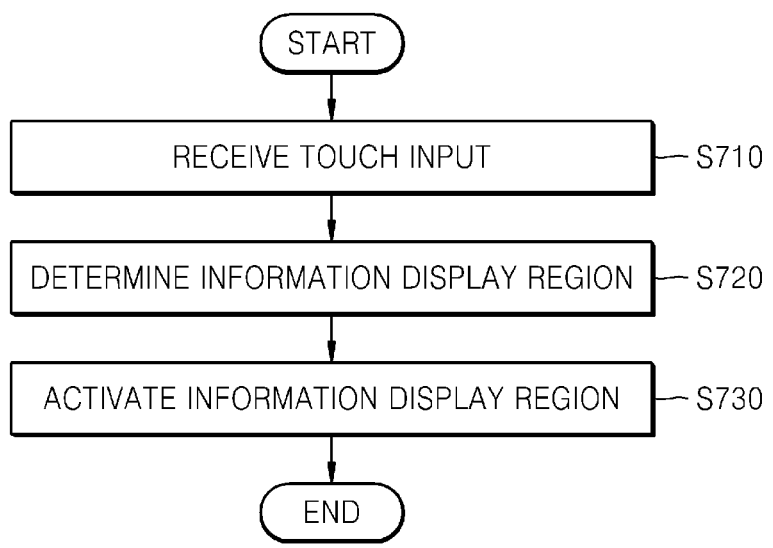
FIG. 7B is a flowchart of a process of the operation of a mobile terminal, according to another exemplary embodiment.

FIG. 7B is a flowchart of a process of the operation of the mobile terminal 100 operating according to another exemplary embodiment.

First, the mobile terminal 100 may receive input information from the sensor unit 1510. According to an exemplary embodiment, the mobile terminal 100 may receive a touch input from the touch sensor included in the sensor unit 1510 in operation S710. In operation S710, the display 110 of the mobile terminal 100 may be in a deactivated state and the touch sensor may be in an activated state.

According to an exemplary embodiment, the AP of the mobile terminal 100 may be in a deactivated state in operation S710. When an input received from the sensor unit 1510 satisfies a pre-set condition, the mobile terminal 100 may activate the AP. In the mobile terminal 100 according to an exemplary embodiment, the SSP may operate separately from the AP. The mobile terminal 100 may connect the sensor unit 1510 to the sensor hub of the SSP. Accordingly, the mobile terminal 100 may collect input information from the sensor unit 1510 when the AP is in a deactivated state and recognize a situation. When the pre-set condition is satisfied, the SSP may activate the deactivated AP. The SSP will be described in detail with reference to FIG. 17.

For example, when a temporal interval between at least two touches is within one second, the AP may be activated to perform operations S720 and S730.

The mobile terminal 100 may determine an information display region on which information is to be displayed from an entire region of the display 110 in operation S720, based on the touch input received in operation S710.

In operation S720, the information display region is a virtual region determined by the mobile terminal 100 to display information on the display 110. The information display region may be variously set according to an exemplary embodiment. One or more exemplary embodiments of determining an information display region will be described with reference to FIGS. 8 through 14.

The information to be displayed on the information display region is information capable of being output by the mobile terminal 100 through the display 110. For example, arbitrary information, such as a missed call message, an alarm message, news information, an application execution icon, a widget, an application execution screen, an image, or text, may be displayed on the information display region. For example, when there is a message about a missed call in the mobile terminal 100, the mobile terminal 100 may display the missed call message on the information display region. In another example, when there is a message about an application installed in the mobile terminal 100, the mobile terminal 100 may display the application execution icon on the information display region.

In operation S730, the mobile terminal 100 may activate the information display region determined in operation S720. The mobile terminal 100 may display information on the activated information display region of the display 110.

According to an exemplary embodiment, the mobile terminal 100 may use different methods of activating the information display region based on features of the display 110, as previously discussed.

Figure 8:
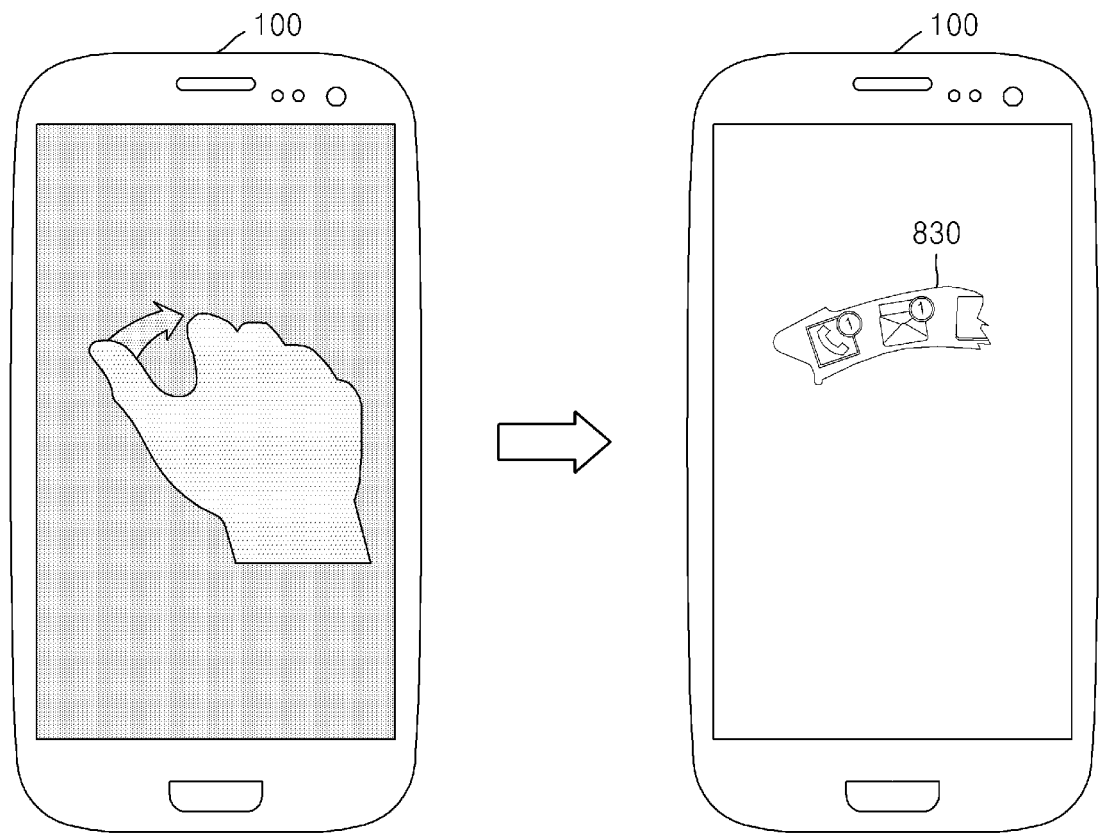
FIG. 8 is a diagram illustrating an operation of a mobile terminal displaying information in an information display region, according to an exemplary embodiment.

FIG. 8 is a diagram illustrating an operation of the mobile terminal 100 displaying information in an information display region, according to an exemplary embodiment.

In FIG. 8, the display 110 may be configured in a form of a touch screen combined with a touch sensor. The mobile terminal 100 may receive a touch input that is performed on the display 110 in operation S810, in a state where the touch sensor is activated and the display 110 is deactivated.

The mobile terminal 100 may determine a region where the touch input is received on the display 110 to be an information display region 830. In operation S820, mobile terminal 100 may activate a region of the display 110 corresponding to the determined information display region 830. The mobile terminal 100 may display information on the activated information display region 830, in operation S820. As shown in FIG. 8, the mobile terminal 100 may display information on the information display region 830 so that a UI, in which the information is displayed in a region of the display 110 rubbed by the user of the mobile terminal 100, may be provided to the user.

According to an exemplary embodiment, when the information displayed in operation S820 is selected according to a user input, the mobile terminal 100 may execute an application related to the selected information.

Figure 9:
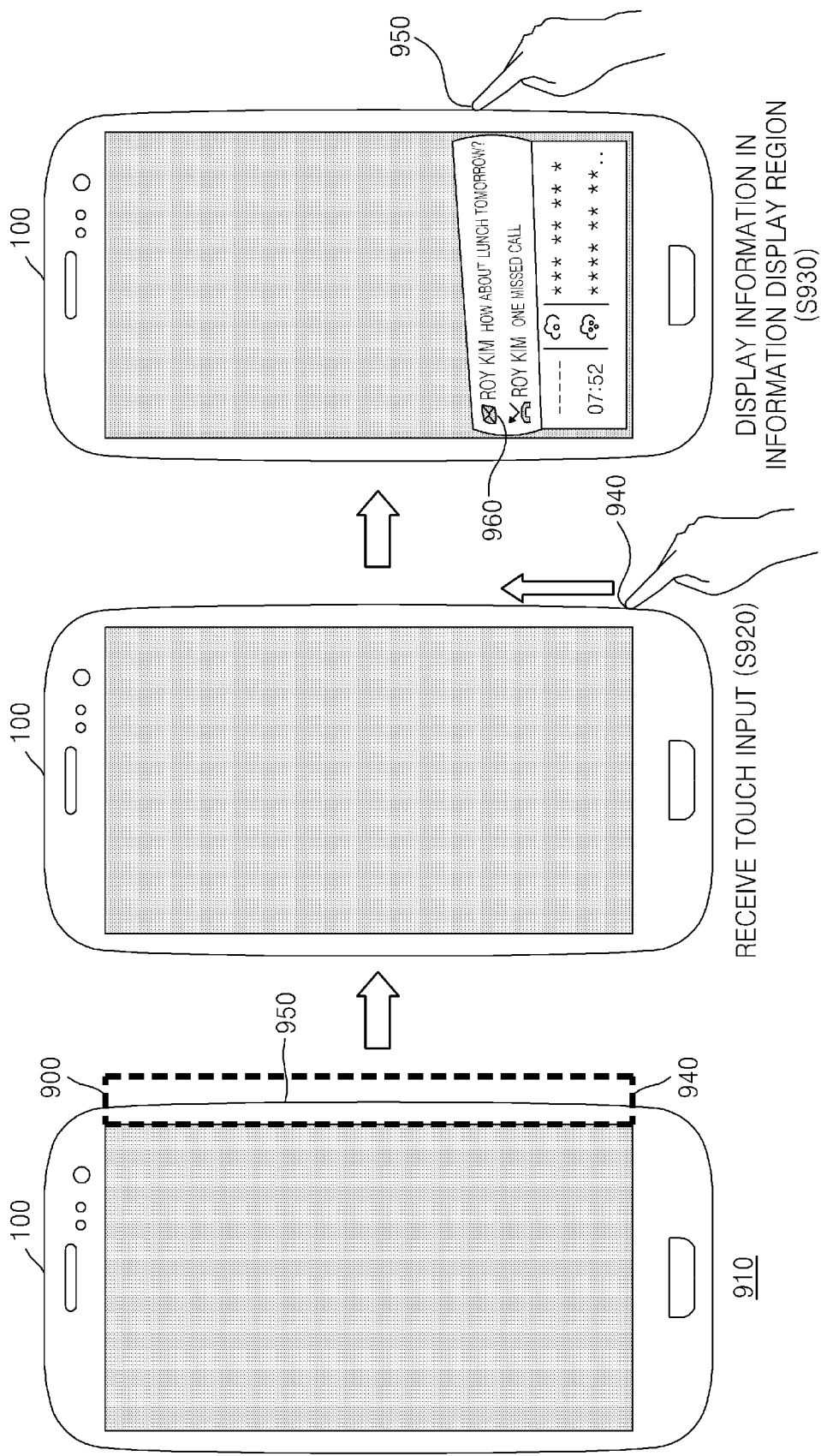
FIG. 9 is a diagram illustrating an operation of a mobile terminal displaying information in an information display region, according to another exemplary embodiment.

FIG. 9 is a diagram illustrating an operation of the mobile terminal 100 displaying information in an information display region 960, according to another exemplary embodiment.

According to an exemplary embodiment, the mobile terminal 100 may include a touch sensor located at one side surface 900 of the display 110, as shown in diagram 910. The side surface 900 of the display 110 is a component of the display 110 that fixes or surrounds the display 110. The side surface 900 of the display 110 may be referred to as a bezel.

In operation S920, when the touch sensor is activated and the display 110 is deactivated the mobile terminal 100 may receive a touch input through the touch sensor located at the side surface 900 of the display 110. The received touch input may be a drag from a certain location of the side surface 900 in a certain direction.

After operation S920, the mobile terminal 100 may determine the information display region 960 according to the received touch input. In operation S930, the information display region 960 may be determined to correspond to a region obtained as the received touch input drags from the certain location in the certain direction. As shown in FIG. 9, when the mobile terminal 100 receives a touch input that is a drag input from a first point 940 to a second point 950, a region of vertical axis coordinates of the display 110 between the first point 940 and the second point 950 may be determined as the information display region 960. The mobile terminal 100 may activate a region of the display 110 corresponding to the determined information display region 960. The mobile terminal 100 may display information on the activated information display region 960.

Figure 10:
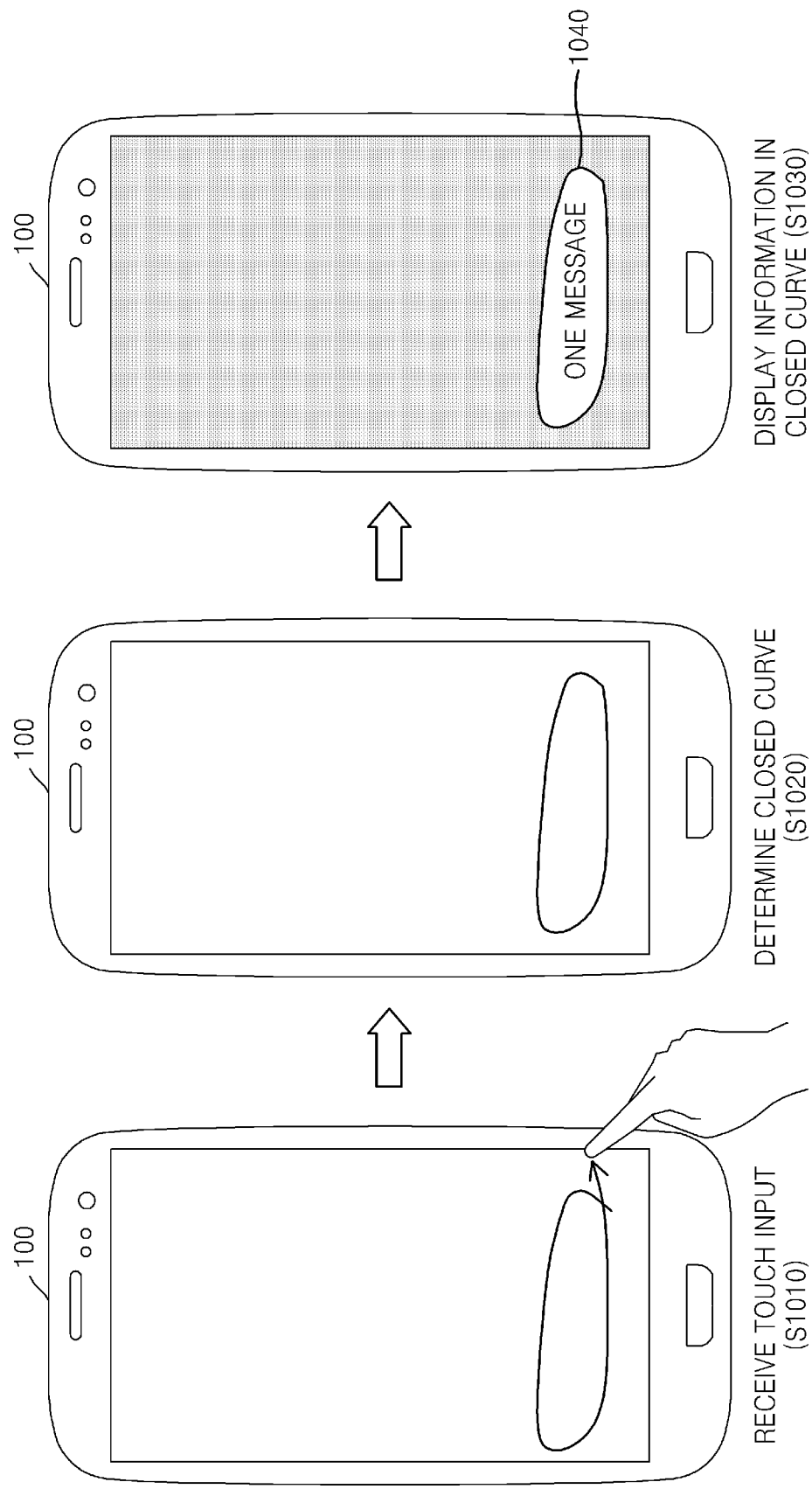
FIG. 10 is a diagram illustrating an operation of a mobile terminal displaying information in an information display region, according to another exemplary embodiment.

FIG. 10 is a diagram illustrating an operation of the mobile terminal 100 displaying information in an information display region 1040, according to another exemplary embodiment.

In operation S1010, when the touch sensor is activated and the display 110 is deactivated, the mobile terminal 100 may receive a touch input through a touch sensor of the display 110.

In operation S1020, the mobile terminal 100 may determine a closed curve corresponding to a location where the touch input is received on the display 110, based on the location. The mobile terminal 100 may determine a region inside the determined closed curve as the information display region 1040.

The mobile terminal 100 may activate the information display region 1040 from the entire region of the display 110. Then, the mobile terminal 100 may display information on the activated information display region 1040 in operation S1030.

Figure 11:
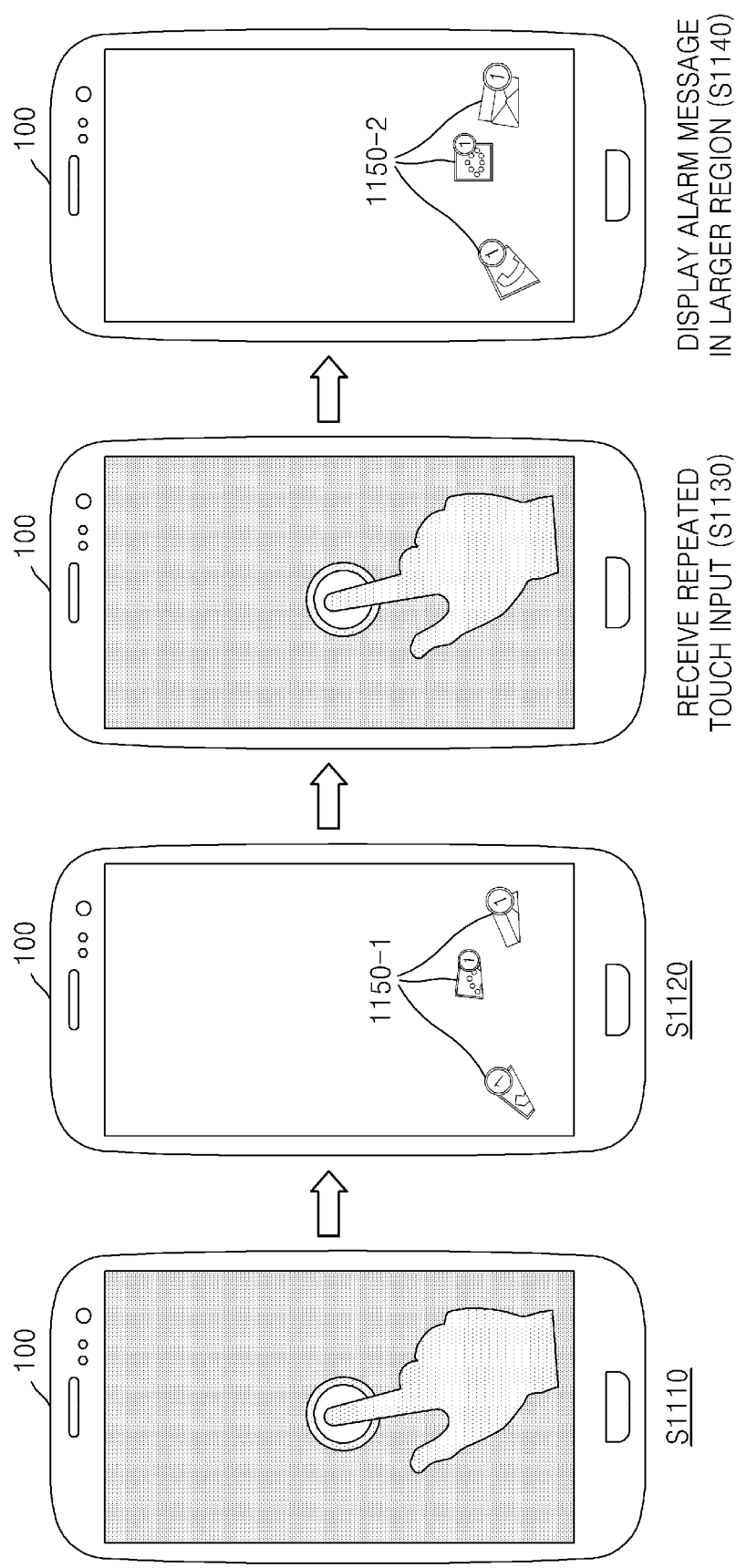
FIG. 11 is a diagram illustrating an operation of a mobile terminal displaying information in an information display region, according to another exemplary embodiment.

FIG. 11 is a diagram illustrating an operation of a mobile terminal displaying information in an information display region, according to another exemplary embodiment.

In operation S1110, when the touch sensor is activated and the display 110 is deactivated, the mobile terminal 100 may receive a touch input from the touch sensor included in the mobile terminal 100. When the touch input is received, the mobile terminal 100 may determine an information display region 1150-1, in operation S1120. The mobile terminal 100 may activate the determined information display region 1150-1. The mobile terminal 100 may display information on the activated information display region 1150-1. According to an exemplary embodiment, in operation S1120, the mobile terminal 100 may determine the information display region 1150-1 based on the amount of information to be displayed on the information display region 1150-1. For example, when there are three alarm messages to be displayed on the information display region 1150-1, the mobile terminal 100 may determine the information display regions 1150-1 for displaying the three alarm messages.

The mobile terminal 100 may then receive a repeated touch input in operation S1130. When the repeated touch input is received, the mobile terminal 100 may determine an information display region 1150-2 having a larger area than the information display region 1150-1 determined in operation S1120. The mobile terminal 100 may activate the determined information display region 1150-2. The mobile terminal 100 may display information on the activated information display region 1150-2 in operation S1140. In other words, the mobile terminal 100 may determine an information display region based on the number of times a touch input is received. By performing operations S1130 and S1140, the mobile terminal 100 may provide a UI in which information is gradually displayed when the user taps the display 110.

Figure 12:
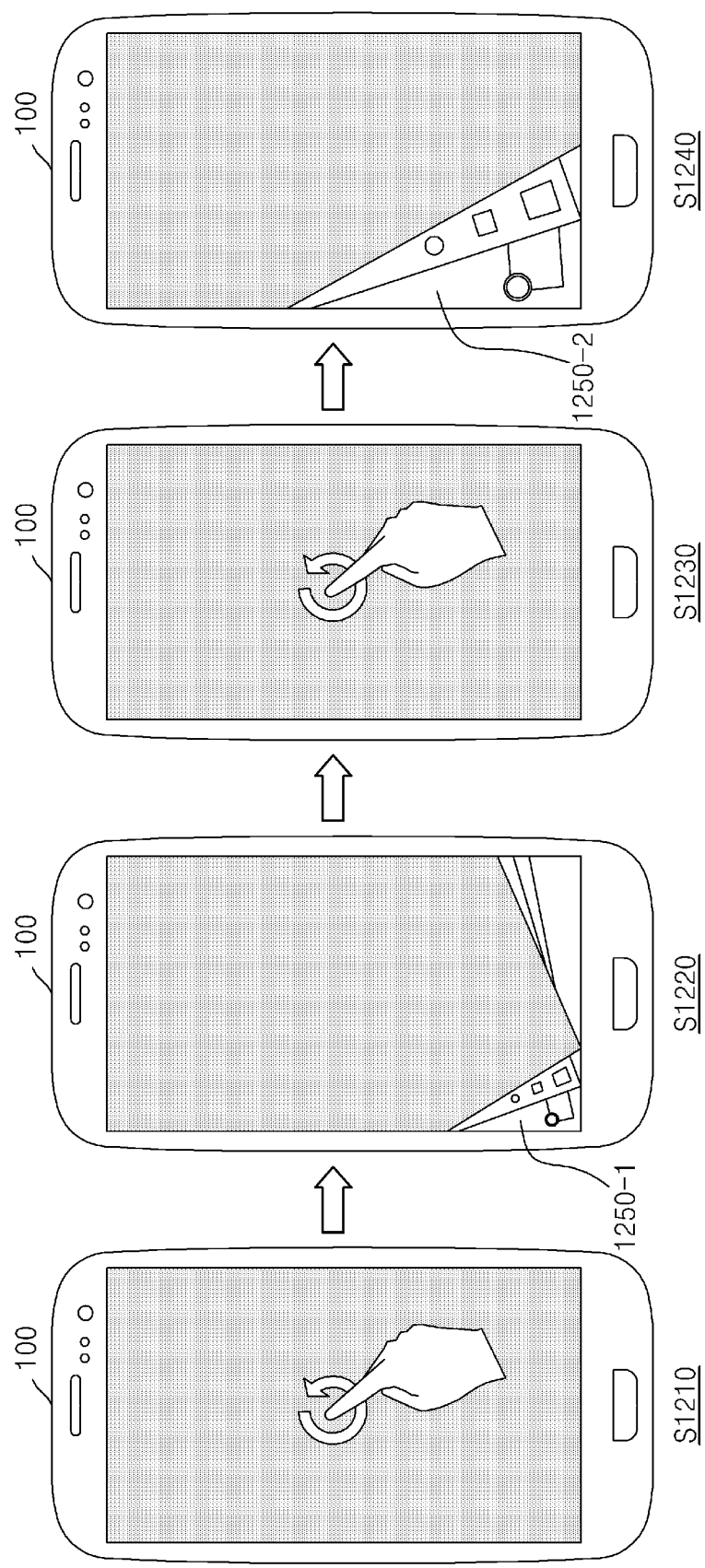
FIG. 12 is a diagram illustrating an operation of a mobile terminal displaying information in an information display region, according to another exemplary embodiment.

FIG. 12 is a diagram illustrating an operation of the mobile terminal 100 displaying information in an information display region, according to another exemplary embodiment.

In operation S1210, when the touch sensor is activated and the display 110 is deactivated, the mobile terminal 100 may receive a touch input from the touch sensor included in the mobile terminal 100. The touch input may be a rotation in a clockwise direction or in a counterclockwise direction. According to an exemplary embodiment, the mobile terminal 100 may determine, in operation S1220, an information display region 1250-1 having an area proportional to a rotation angle or the number of rotations in the touch input. The mobile terminal 100 may activate the determined information display region 1250-1 and display information on the activated information display region 1250-1.

According to an exemplary embodiment, when the mobile terminal 100 repeatedly receives the same touch input in operation S1230, the mobile terminal 100 may determine an information display region 1250-2 having a larger area than the information display region 1250-1 determined in operation S1220. The mobile terminal 100 may activate the display 110 corresponding to the information display region 1250-2. The mobile terminal 100 may display information on the information display region 1250-2.

When the mobile terminal 100 receives a touch input of rotating in a direction opposite to the rotation direction of the touch input received in operation S1210, the mobile terminal 100 may determine an information display region having a smaller area than the information display region 1250-1 determined in operation S1220. The mobile terminal 100 may deactivate the display 110 corresponding to the information display region having the smaller area than the information display region 1250-1.

Figure 13:
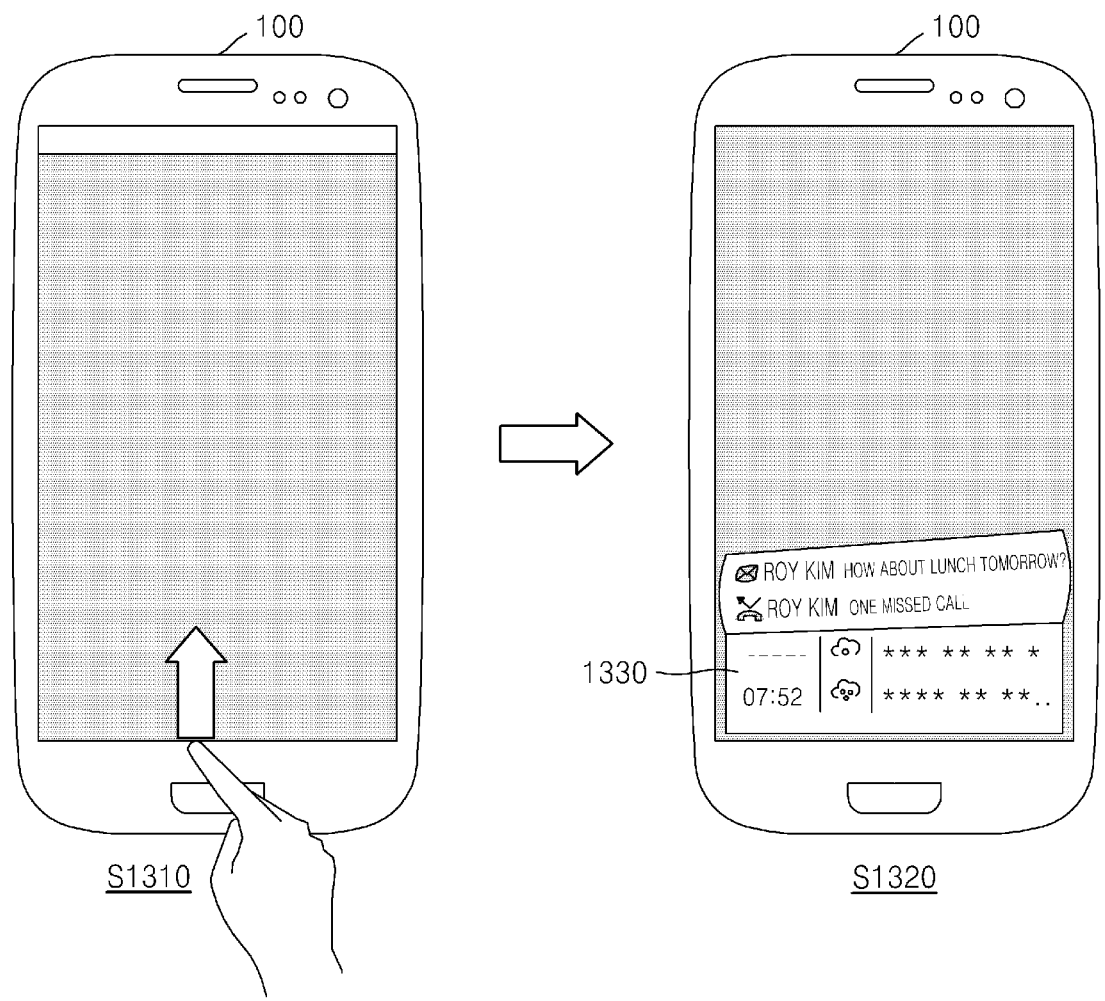
FIG. 13 is a diagram illustrating an operation of a mobile terminal displaying information in an information display region, according to another exemplary embodiment.

FIG. 13 is a diagram illustrating an operation of the mobile terminal 100 displaying information in an information display region 1330, according to another exemplary embodiment.

In FIG. 13, the display 110 may be configured in a form of a touch screen combined with a touch sensor. In operation S1310, when the touch sensor is activated and the display 110 is deactivated, the mobile terminal 100 may receive a touch input that is performed on the display 110. According to one exemplary embodiment, the touch input may be a dragging input in a certain direction.

After the input, the mobile terminal 100 may determine the information display region 1330. The mobile terminal 100 may activate the display 110 corresponding to the activated information display region 1330. The mobile terminal 100 may display information on the activated information display region 1330 in operation S1320. The mobile terminal 100 may also gradually increase an area of the information display region 1330 in a certain direction based on the received touch input.

Figure 14:
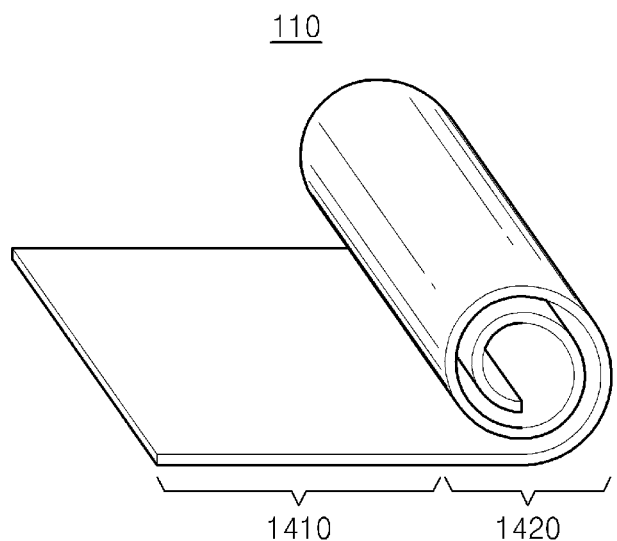
FIG. 14 is a diagram illustrating an operation of a mobile terminal displaying information in an information display region, according to another exemplary embodiment.

FIG. 14 is a diagram illustrating an operation of the mobile terminal 100 displaying information in an information display region, according to another exemplary embodiment.

In FIG. 14, the display 110 is configured in a form of a flexible display. The sensor unit 1510 may include a sensor that detects bending of the display 110.

According to an exemplary embodiment, the mobile terminal 100 may receive information about a bent region 1420 and an unbent region 1410 of the display 110 from the sensor unit 1510. The mobile terminal 100 may determine the unbent region 1410 as an information display region. However, exemplary embodiments are not limited thereto, and the display 110 may be variously realized based on a bent angle, a deformation of the display 110, or the like. Alternatively, the mobile terminal 100 may determine the bent region 1420 as an information display region.

One or more exemplary embodiments are not limited to those described above with reference to FIGS. 8 through 14. For example, when the mobile terminal 100 receives a touch input in a state in which the touch sensor is activated, the display 110 is deactivated, and the mobile terminal 100 is reproducing content, the mobile terminal 100 may compare the touch input and the content being reproduced, and output a certain image on the display 110 based on a result of the comparison.

In another example, the mobile terminal 100 may receive input information matched to certain gesture information from an acceleration sensor included in the mobile terminal 100, in a state in which the acceleration sensor is activated and the display 110 is deactivated. Upon receiving the input information, the mobile terminal 100 may display information through the display 110.

In another example, when a part of the display 110 is covered (for example, when a hand of the user covers the display 110) in a state in which the display 110 is deactivated, the mobile terminal 100 may display information in a region that is not covered. Alternatively, when there is an alarm message, the mobile terminal 100 may activate only a partial region of the display 110 and display the alarm message in the activated partial region of the display 110.

In another example, the mobile terminal 100 may determine whether a received touch input has a matching function, in a state in which the touch sensor of the mobile terminal 100 is activated and the display 110 is deactivated. When the received touch input has a matching function, the mobile terminal 100 may perform the matching function. When the received touch input does not have a matching function, the mobile terminal 100 may change a displayed background image or a UI when the display 110 is activated based on the received touch input.

FIG. 15 is a block diagram illustrating a structure of the mobile terminal 100 according to an exemplary embodiment.

The mobile terminal 100 according to an exemplary embodiment may include the sensor unit (i.e., sensor) 1510, an output unit (i.e., outputter) 1520, and a control unit (i.e., controller) 1500. The mobile terminal 100 may be realized by modifying components shown in FIG. 15, or by adding more components than those shown in FIG. 15.

Figure 16:
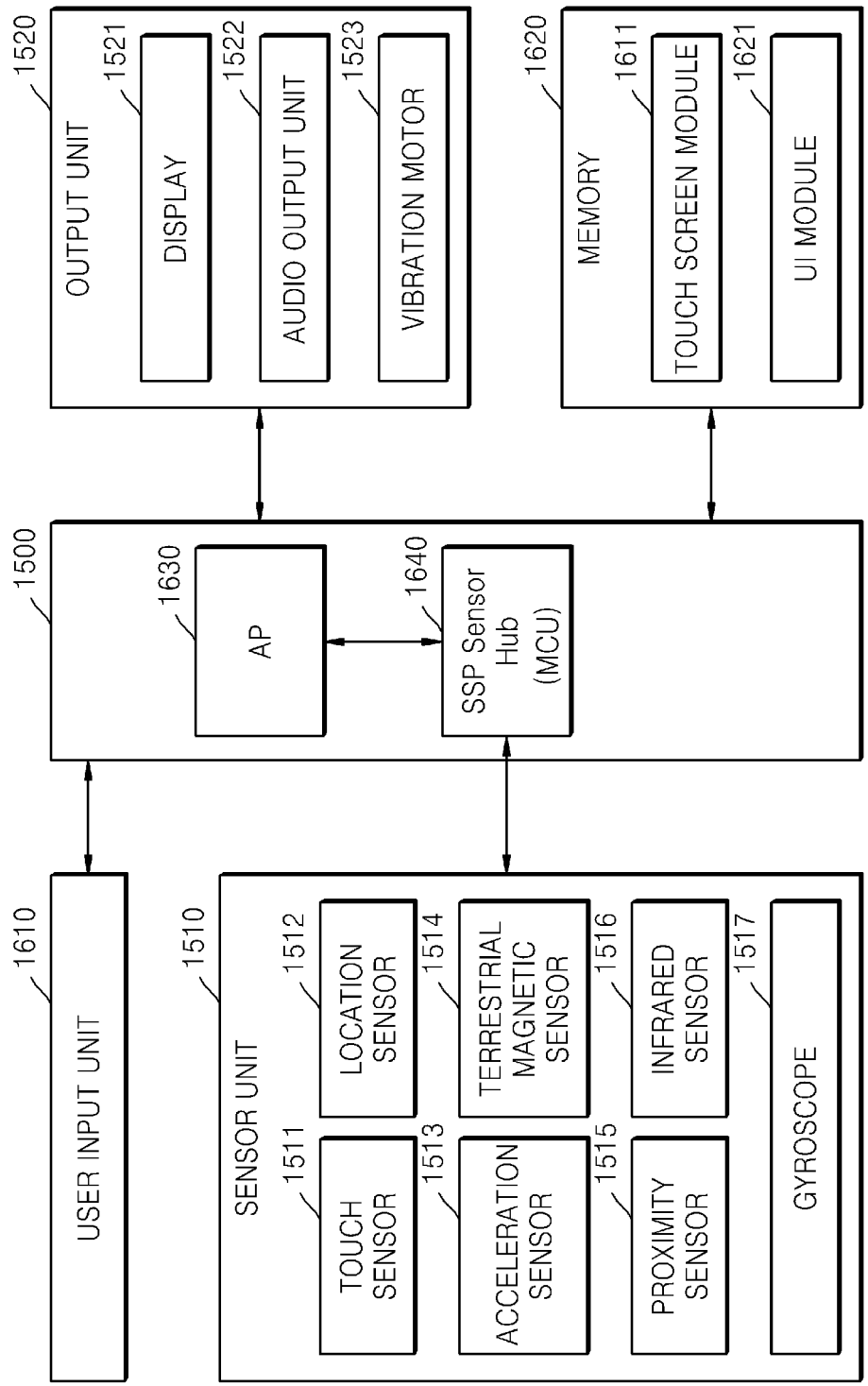
FIG. 16 is a block diagram illustrating a structure of a mobile terminal, according to an exemplary embodiment.

For example, as shown in FIG. 16, the mobile terminal 100 according to an exemplary embodiment may further include a user input unit (i.e., user inputter) 1610 and a memory 1620 as well as the sensor unit 1510, the output unit 1520, and the control unit 1500.

The sensor unit 1510 includes at least one sensor. The sensor unit 1510 may detect a state of the mobile terminal 100 or a state around the mobile terminal 100, and transmit the detected state to the control unit 1500.

According to an exemplary embodiment, the sensor unit 1510 may include at least one of a touch sensor 1511, a location sensor 1512, an acceleration sensor 1513, a terrestrial magnetic sensor 1514, a proximity sensor 1515, an infrared sensor 1516, and a gyroscope 1517, but is not limited thereto.

In FIG. 16, the sensor unit 1510 is illustrated separately from the output unit 1520. However, the touch sensor 1511 included in the sensor unit 1510 and a display 1521 included in the output unit 1520 may be combined to form one device, such as a touch screen.

The output unit 1520 may include the display 1521, the audio output unit (i.e., audio outputter) 1522, and the vibration motor 1523. The display 1521 may display information processed by the mobile terminal 100. For example, the display 1521 may display a UI, image content, or an application execution screen.

In addition, when the display 1521 is configured as a touch screen by forming a layer structure with the touch sensor 1511, the display 1521 may be used as an input device as well as an output device. The display 1521 may be configured as an LCD, an LED display, an OLED display, a 3D display, or a PDP. Also, the display 1521 may be configured as a panel having a fixed shape or a flexible display. The display 1521 may be realized in any one of various forms and is not limited to those described above. The mobile terminal 100 may include a plurality of displays 1521.

The control unit 1500 may control each component of the mobile terminal 100 and process various types of information. According to an exemplary embodiment, the control unit 1500 may include at least one processor.

According to an exemplary embodiment, the control unit 1500 may receive input information from the sensor unit 1510, when the output unit 1520 is in a deactivated state and the sensor unit 1510 is in an activated state. Upon receiving the input information, the control unit 1500 may determine an operation of the mobile terminal 100 corresponding to the received input information. When the output unit 1520 is activated, the control unit 1500 may execute the determined operation of the mobile terminal 100. For example, the control unit 1500 may receive a touch input from the touch sensor 1511, and when the display 1521 is activated, the control unit 1500 may control each component of the mobile terminal 100 so that the mobile terminal 100 performs an operation corresponding to the received touch input.

Alternatively, the touch input may be an input received by the control unit 1500 when the touch sensor 1511 recognizes at least two touches on the mobile terminal 100, and the control unit 1500 may determine an operation of the mobile terminal 100 based on a temporal interval between the at least two touches.

Alternatively, the control unit 1500 may determine whether a touch input is recognizable as at least one character and determine an operation of the mobile terminal 100 corresponding to the touch input based on a result of the determination.

According to another exemplary embodiment, the control unit 1500 may receive a touch input from the touch sensor included in the sensor unit 1510, during a period that the output unit 1520 may be in a deactivated state and the sensor unit 1510 may be in an activated state. The control unit 1500 may determine an information display region where information is to be displayed from an entire region of the display 1521 based on the received touch input. The control unit 1500 may activate the information display region determined from the entire region of the display 1521 and display information on the activated information display region through the display 1521.

FIG. 16 is a block diagram illustrating in detail a structure of the mobile terminal 100 according to an embodiment of the present invention.

According to an exemplary embodiment, the mobile terminal 100 may include the control unit 1500, the sensor unit 1510, the output unit 1520, the user input unit 1610, and the memory 1620.

The control unit 1500 may control each component of the mobile terminal 100 and process various types of information. According to an exemplary embodiment, the control unit 1500 may include at least one processor.

The sensor unit 1510 includes at least one sensor. The sensor unit 1510 may detect a state of the mobile terminal 100 or a state around the mobile terminal 100, and transmit the detected state to the control unit 1500.

According to some embodiments of the present invention, the sensor unit 1510 may include at least one of the touch sensor 1511, the location sensor 1512, the acceleration sensor 1513, the terrestrial magnetic sensor 1514, the proximity sensor 1515, the infrared sensor 1516, and the gyroscope 1517, but is not limited thereto.

According to an exemplary embodiment, the output unit 1520 is used to output an audio signal, a video signal, or a vibration signal, and may include the display 1521, an audio output unit 1522, and a vibration motor 1523. The display 110 of FIG. 1 and the display 1521 of FIG. 16 are the same component.

The output unit 1520 may include the display 1521, the audio output unit 1522, and the vibration motor 1523. The display 1521 may display information processed by the mobile terminal 100. For example, the display 1521 may display a UI, image content, or an application execution screen.

In addition, when the display 1521 is configured as a touch screen by forming a layer structure with the touch sensor 1511, the display 1521 may be used as an input device as well as an output device. The display 1521 may be configured as an LCD, an LED display, an OLED display, a 3D display, or a PDP. Also, the display 1521 may be configured as a panel having a fixed shape or a flexible display. The display 1521 may be realized in any one of various forms and is not limited to those described above. The mobile terminal 100 may include a plurality of displays 1521.

The audio output unit 1522 may output audio data. Also, the audio output unit 1522 may output an audio signal related to a function performed by the mobile terminal 100, for example, a message reception sound. The audio output unit 1522 may include a speaker or a buzzer.

The vibration motor 1523 may output a vibration signal. For example, the vibration motor 1523 may output a vibration signal when a touch input is detected through the touch sensor.

The user input unit 1610 is a unit used by the user to input data for controlling the mobile terminal 100. Examples of the user input unit 1610 include a keypad, a dome switch, a touch pad, a jog wheel, and a jog switch, but are not limited thereto. If required, the user input unit 1610 may form one component with the sensor unit 1510.

The memory 1620 may store a program for the control unit 1500 to process and control data. Alternatively, the memory 1620 may store input and output data. The memory 1620 may include at least one type of storage medium from among a flash memory type, a hard disk type, a multimedia card micro type, a card type (such as a secure digital (SD) card or extreme digital (XD) card), a random access memory (RAM) type, a static random access memory (SRAM) type, a read-only memory (ROM) type, an electrically erasable programmable read-only memory (EEPROM) type, a programmable read-only memory (PROM) type, a magnetic memory type, a magnetic disk type, and an optical disk type. Also, the mobile terminal 100 may operate a web storage server or a cloud server for performing a storage function of the memory 1620 on the Internet.

Programs stored in the memory 1620 may be classified into a plurality of modules according to functions. For example, the programs may be classified into a touch screen module 1611, a UI module 1621, and a character recognition module (not shown).

The touch screen module 1611 may detect a touch input on the touch screen and transmit information about the touch input to the control unit 1500. The touch screen module 1611 according to an embodiment may recognize and analyze a touch code. If required, the touch screen module 1611 may be configured as separate hardware including a controller.

The UI module 1621 may provide a UI by using the output unit 1520.

According to an embodiment, the control unit 1500 may include a sensor hub 1640 of an SSP. The sensor hub 1640 may be realized as hardware or software, or as a combination of hardware and software. For example, the sensor hub 1640 may include a micro controller unit (MCU).

The sensor hub 1640 according to an exemplary embodiment may be connected to the sensor unit 1510 and may collect sensing information from the sensor unit 1510 even when an AP 1630 is in a deactivated state. For example, the sensor hub 1640 may obtain a touch input detected by the touch sensor 1511.

The sensor hub 1640 according to an exemplary embodiment may determine whether there is a function of the mobile terminal 100 matching the touch input obtained through the touch sensor 1511. When there is a function of the mobile terminal 100 matching the touch input, the sensor hub 1640 may activate the AP 1630 in the deactivated state.

The control unit 1500 may include the AP 1630. The AP 1630 may control execution of various applications. For example, the AP 1630 may determine an application corresponding to a touch input received from the touch sensor 1511 and execute the determined application.

Figure 17:
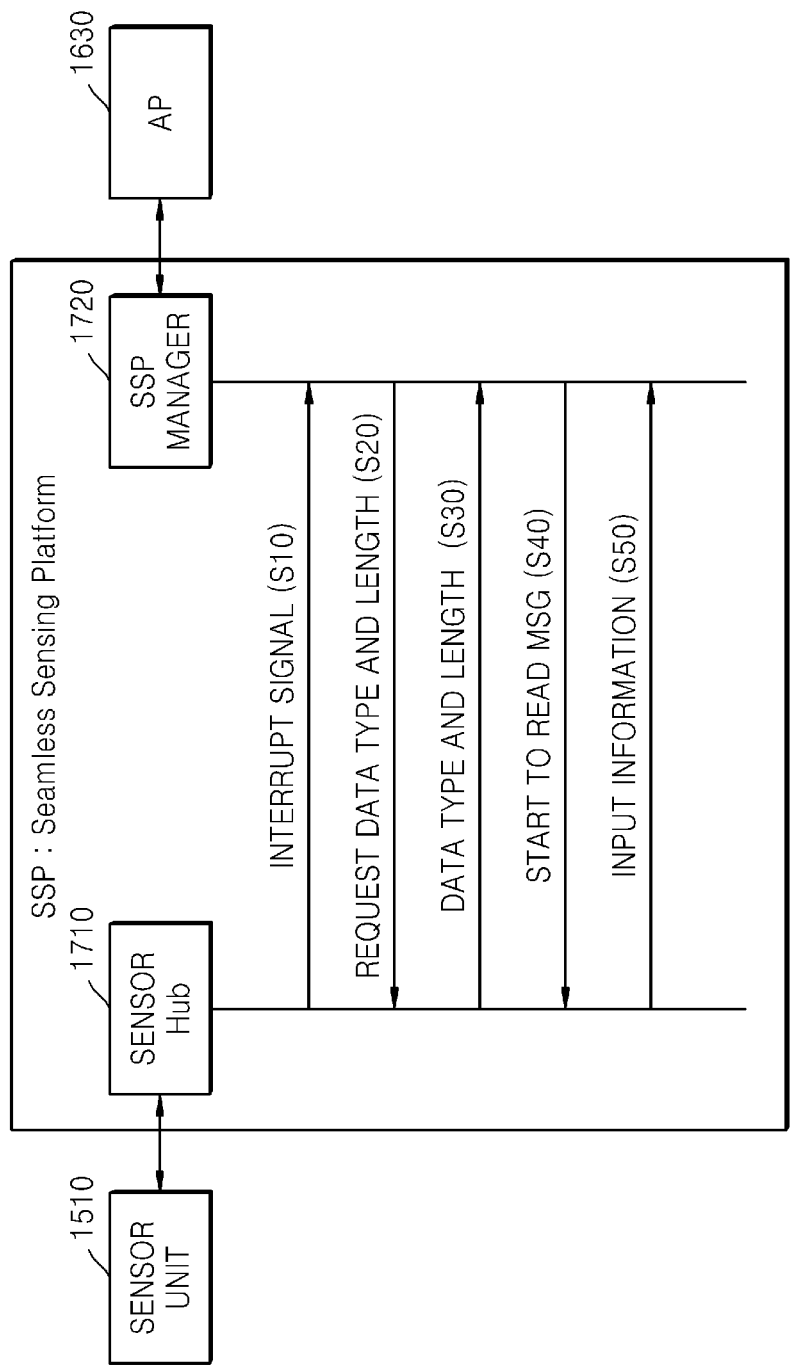
FIG. 17 is a diagram for describing an operation of a seamless sensing platform (SSP) according to an exemplary embodiment.

FIG. 17 is a diagram for describing an operation of an SSP related to an exemplary embodiment.

The SSP may include a sensor hub 1710 and an SSP manager 1720. The sensor hub 1710 of FIG. 17 and the sensor hub 1640 of FIG. 16 are the same component. The sensor unit 1510 may be combined to the sensor hub 1710, and the SSP manager 1720 may be included in a framework of the AP 1630.

Accordingly, the sensor hub 1710 may receive input information, such as a touch input, through the sensor unit 1510. Here, when the AP 1630 in a deactivated state needs to be activated, for example, when there is an application to be executed corresponding to the received touch input, the sensor hub 1710 may transmit an interrupt signal to the SSP manager 1720 in operation S10 indicating that there is data to be transmitted.

The SSP manager 1720 may transmit a signal requesting a data type and length of data to be transmitted by the sensor hub 1710, to the sensor hub 1710, in operation S20, and receive the data type and length of the data from the sensor hub 1710 in operation S30. The SSP manager 1720 transmits a reception preparation complete message (start to read MSG) to the sensor hub 1710 in operation S40, and upon receiving the start to read MSG, the sensor hub 1710 may process input information to a predetermined packet and transmit the predetermined packet to the SSP manager 1720 in operation S50. During this process, the AP 1630 in the deactivated state is activated.

Figure 18:
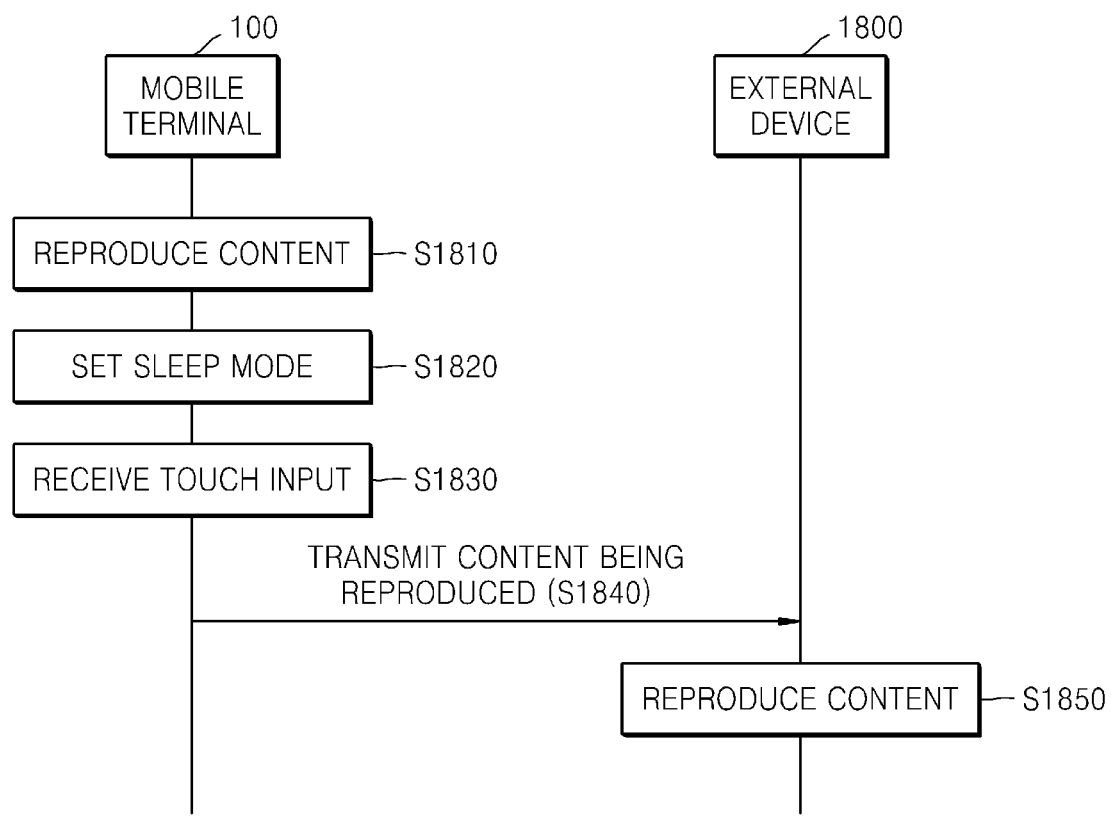
FIG. 18 is a flowchart of a process of the operation of a mobile terminal, according to another exemplary embodiment.

FIG. 18 is a flowchart of a process of the operation of the mobile terminal 100, according to another exemplary embodiment.

First, the mobile terminal 100 may reproduce content in operation S1810. Here, the content may be video, audio, or streaming data, but is not limited thereto. While the content is being reproduced, the mobile terminal 100 may set a sleep mode in operation S1820. The mobile terminal 100 may continuously reproduce the content during the sleep mode.

Then, the mobile terminal 100 may receive a touch input in operation S1830. Here, the touch input may vary according to exemplary embodiments. For example, the touch input may be any one of a drag gesture, a tap input, a panning gesture, a fling gesture, and a swipe gesture.

In response to the received touch input, the mobile terminal 100 may transmit the content being reproduced to an external device 1800, in operation S1840. Here, the external device 1800 may be a device capable of reproducing content. Also, the external device 1800 may perform communication to receive the content from the mobile terminal 1800. The external device 1800 may directly communicate with the mobile terminal 100 through near field wireless communication (for example, Bluetooth™ or WiFi-direct). Alternatively, the external device 1800 may communicate with the mobile terminal 100 through a network.

In operation S1840, instead of transmitting the content to the external device 1800, the mobile terminal 100 may transmit information for accessing the content. For example, the mobile terminal 100 may transmit a uniform resource locator (URL) of the content to the external device 1800.

The external device 1800 may reproduce the content based on information received from the mobile terminal 100, in operation S1850. Here, the external device 1800 may reproduce the content from a location of the content being reproduced by the mobile terminal 100, based on a reproduction location indicating a location that was being reproduced by the mobile terminal 100. Alternatively, the external device 1800 may reproduce the content from the beginning.

Figure 19:
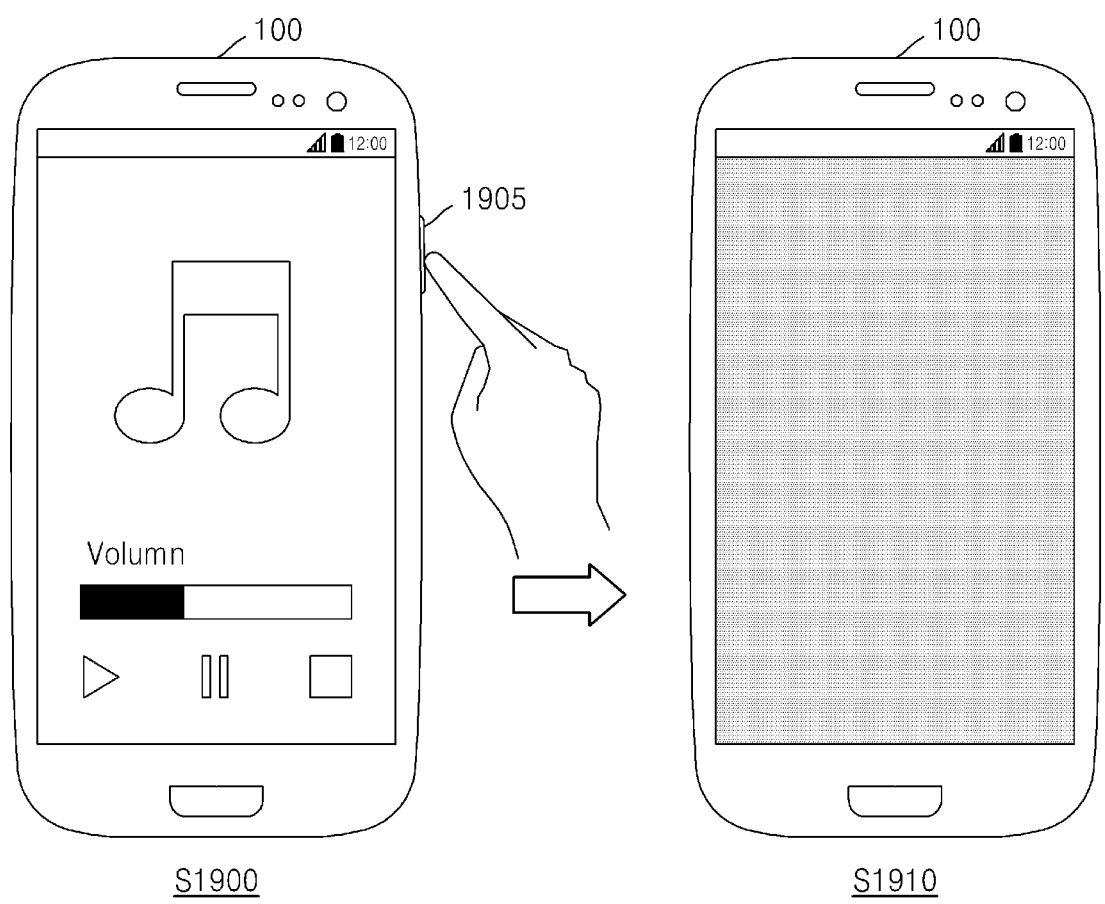
FIGS. 19 and 20 are diagrams for describing operations of a mobile terminal, according to other exemplary embodiments.
Figure 20:
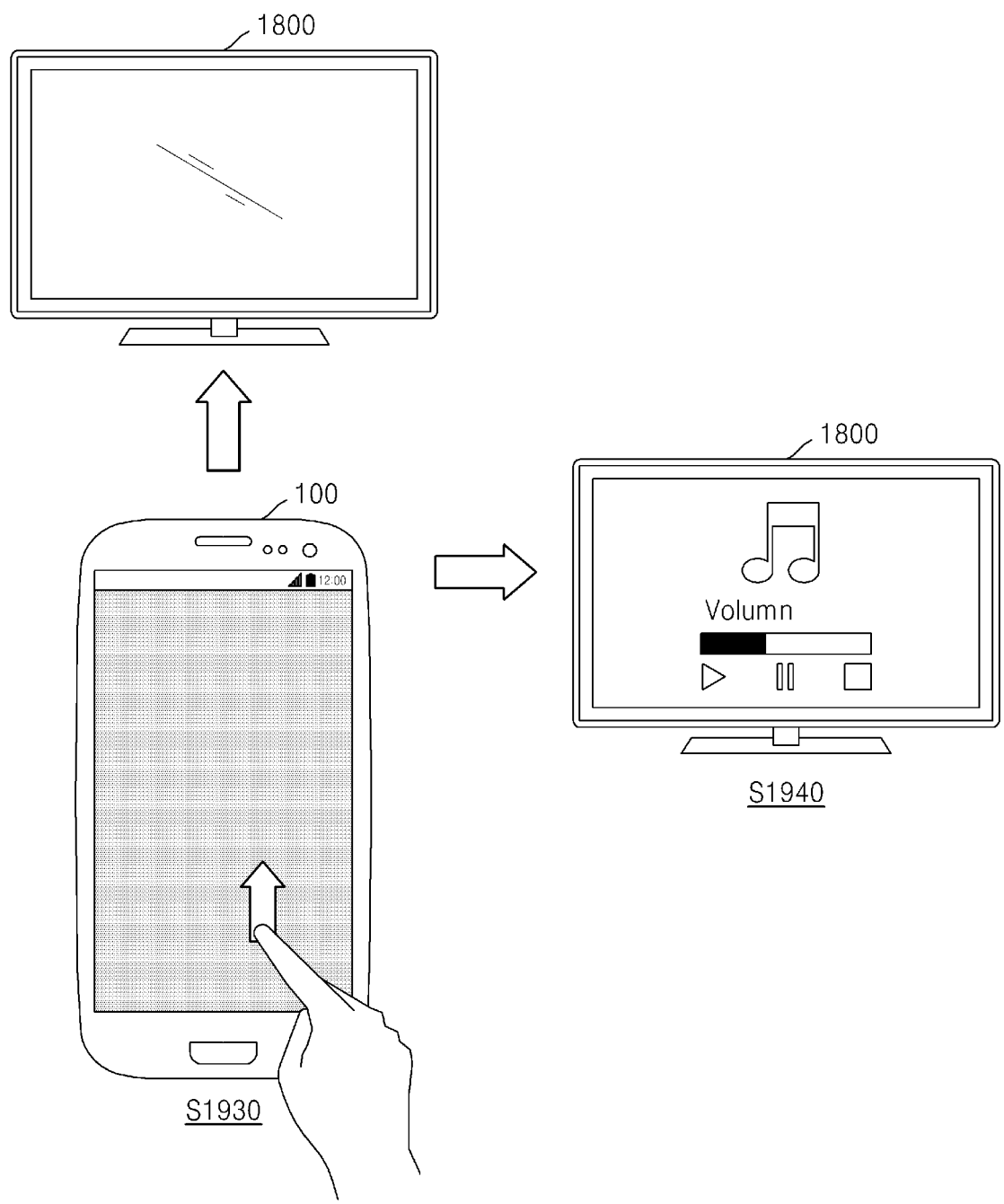

FIGS. 19 and 20 are diagrams for describing operations of the mobile terminal 100 according to other exemplary embodiments. In detail, FIGS. 19 and 20 are diagrams for describing an operation of reproducing, in the external device 1800, audio content being reproduced by the mobile terminal 100.

The mobile terminal 100 according to exemplary embodiments may reproduce audio content. When a sleep mode button 1905 is selected in operation S1900 while the audio content is being reproduced, the mobile terminal 100 may deactivate the display of the mobile terminal 100 in operation S1910. Even if the display of the mobile terminal 100 is deactivated, the touch sensor may be activated and the mobile terminal 100 may continuously reproduce the audio content.

The mobile terminal 100 may receive a touch input from the user in operation S1930. As shown in FIG. 20, the mobile terminal 100 may receive a touch input of moving from a touch location on the touch screen of the mobile terminal 100 in one direction. When the touch input is received, the mobile terminal 100 may transmit the audio content to the external device 1800.

Upon receiving the audio content, the external device 1800 may reproduce the audio content in operation S1940. Here, the external device 1800 may receive information about a reproduction environment, such as volume or a reproduction location, from the mobile terminal 100 and set a reproduction environment of the audio content based on the received information.

According to exemplary embodiments, while determining an operation of the mobile terminal 100, the touch input may be replaced by another type of input, or the touch input and another type of input may be both used.

Figure 21:
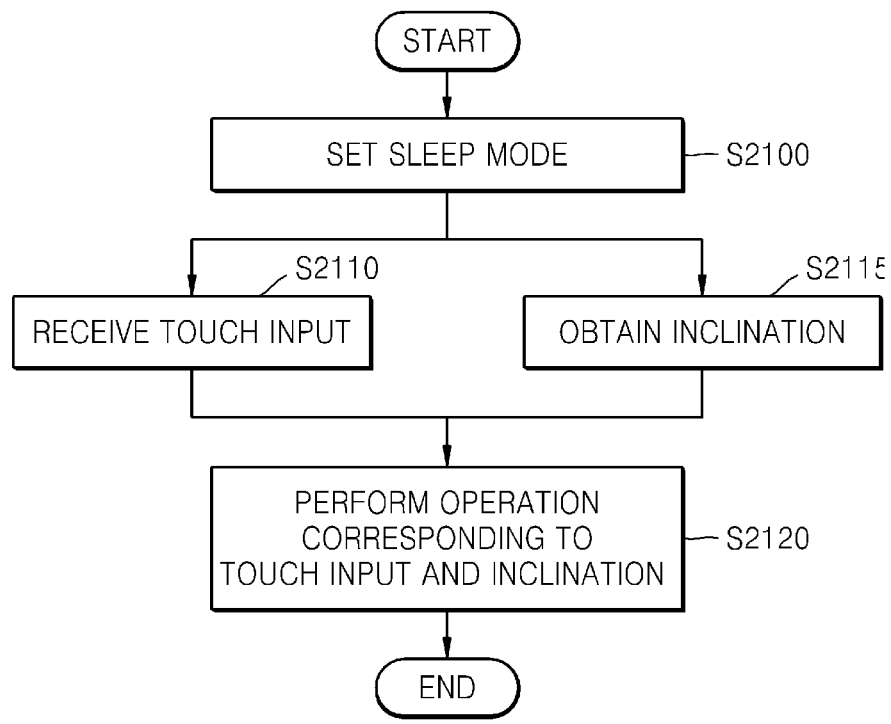
FIG. 21 is a flowchart of a process of the operation of a mobile terminal, according to another exemplary embodiment.

FIG. 21 is a flowchart of a process of the operation of a mobile terminal, according to another exemplary embodiment. The mobile terminal for performing the process of FIG. 21 may further include a tilt sensor. The tilt sensor is a sensor for detecting an inclination degree of the mobile terminal. For example, the tilt sensor may be a gyro sensor.

First, the mobile terminal may set a sleep mode in operation S2100. When the sleep mode is set, a display of the mobile terminal may be deactivated in a state where a touch sensor and the tilt sensor of the mobile terminal are activated.

The mobile terminal may receive a touch input by using the touch sensor during the sleep mode, in operation S2110, and may obtain an inclination by using the tilt sensor in operation S2115.

Then, the mobile terminal may determine an operation corresponding to the touch input and the inclination. Also, the mobile terminal may perform the determined operation in operation S2120. In other words, even when the same touch input is received, the mobile terminal may perform different operations based on the inclination.

Figure 22:
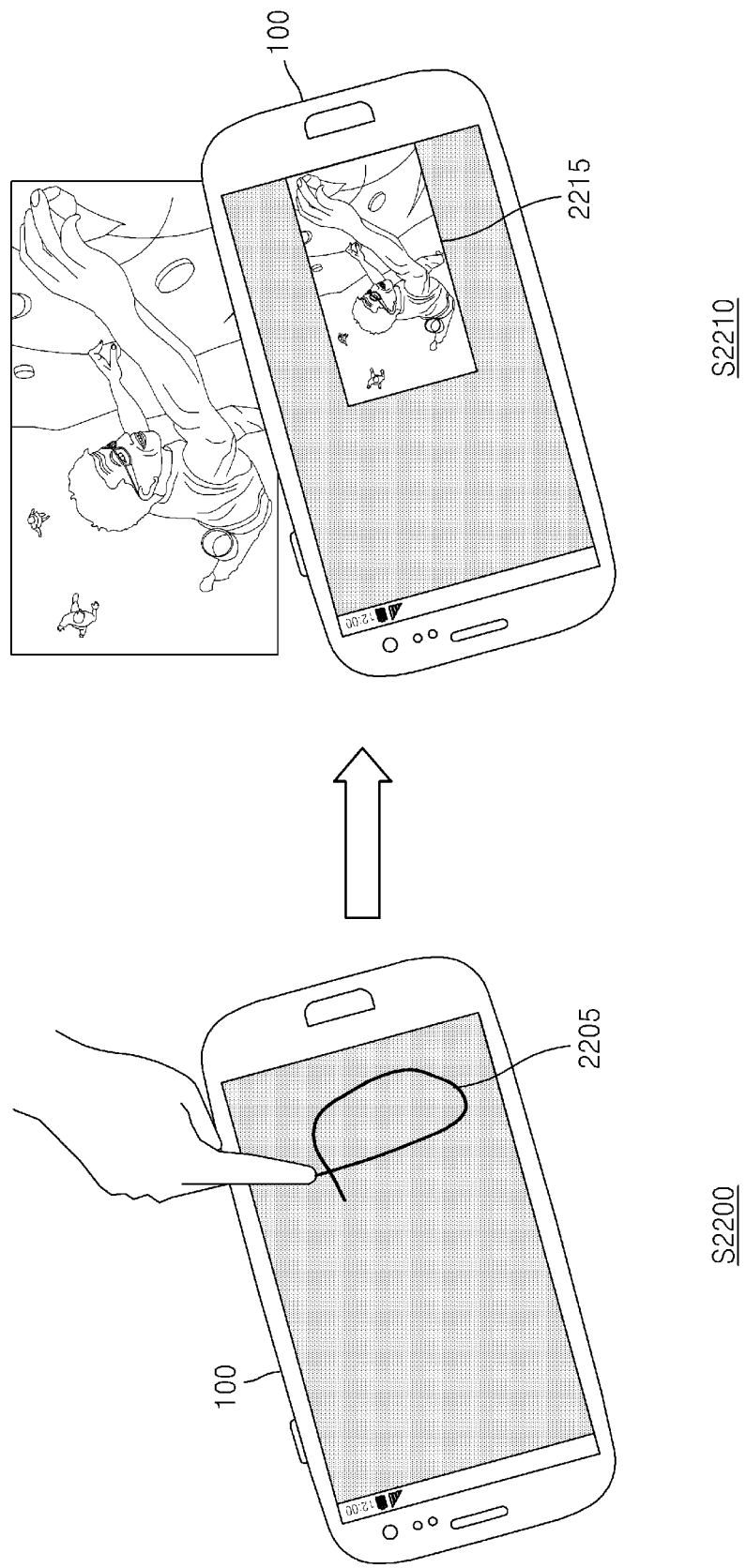
FIGS. 22 and 23 are diagrams for describing operations of a mobile terminal, according to other exemplary embodiments.
Figure 23:
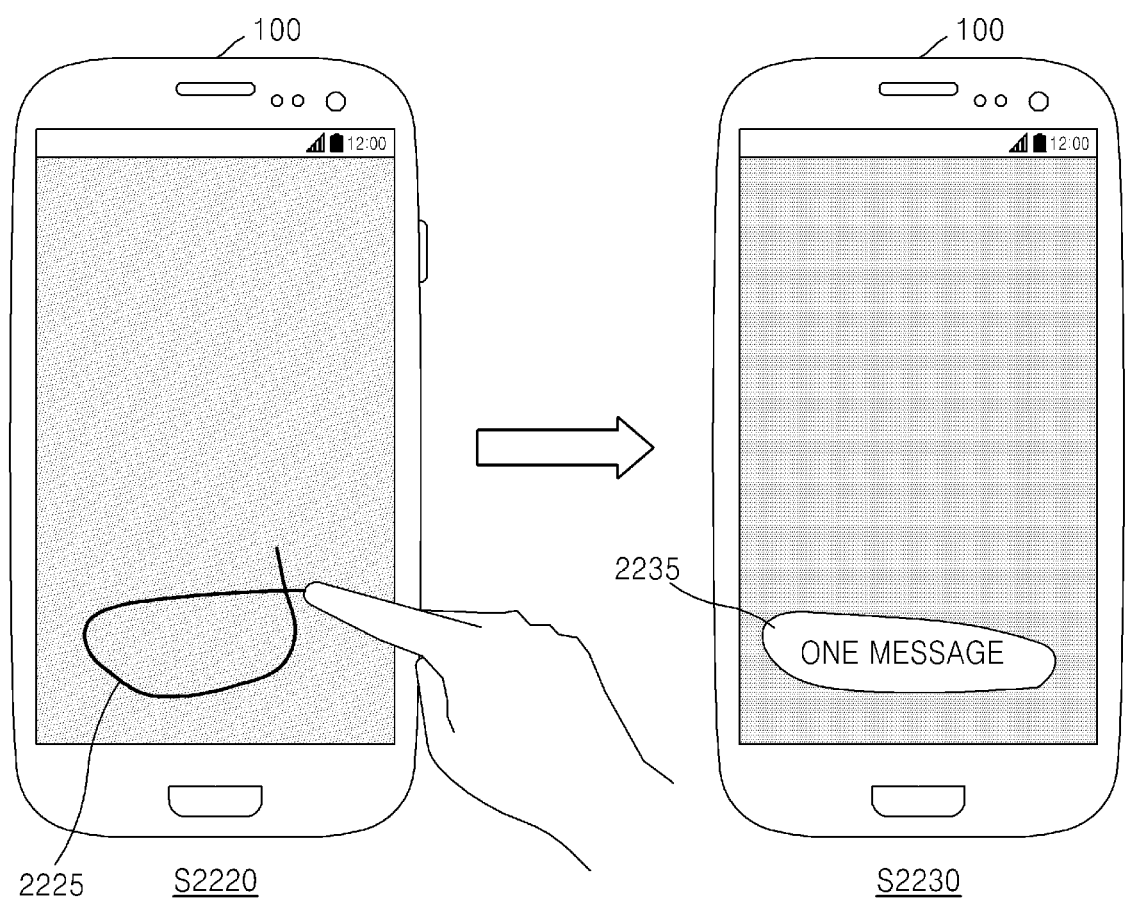

FIGS. 22 and 23 are diagrams for describing operations of the mobile terminal 100 according to other exemplary embodiments. FIGS. 22 and 23 are diagrams for describing operations of the mobile terminal 100 when the mobile terminal 100 receives a touch input in a sleep mode.

Referring to FIG. 22, the mobile terminal 100 may receive a touch input having a trace of a closed curve 2205 from a user, in operation S2200, while the mobile terminal 100 is horizontally tilted. When the touch input is received while the mobile terminal 100 is horizontally tilted, the mobile terminal 100 according to exemplary embodiments may execute a camera application for taking a picture. The mobile terminal 100 may display an execution screen 2215 of the executed camera application within the closed curve 2205. Here, a region of the display of the mobile terminal 100, in which the execution screen 2215 is not displayed, may maintain a deactivated state.

Also, referring to FIG. 23, the mobile terminal 100 may receive the touch input having the trace of the closed curve 2205 from the user, in operation S2220, while the mobile terminal 100 is vertically erected. When the touch input is received while the mobile terminal 100 is vertically erected, the mobile terminal 100 may display an alarm message 2235 inside the closed curve 2205.

FIGS. 22 and 23 are only examples, and thus may vary according to exemplary embodiments. A touch input or a screen displayed on the display may vary according to exemplary embodiments.

According to other exemplary embodiments, the mobile terminal 100 may control an application according to a received touch input while a sleep mode is set. Alternatively, the mobile terminal 100 may perform different operations according to an application being executed. When the sleep mode is set, the mobile terminal 100 may deactivate the display of the touch screen. Here, the touch sensor of the touch screen may maintain an activated state. When there is an application being executed by the AP of the mobile terminal 100 during the sleep mode, the mobile terminal 100 may control the application according to a touch input of the user. The application being executed by the AP denotes an application having a control operation corresponding to the touch input of the user.

An application that is a target of control according to a touch input or is a standard for determining an operation to be performed by the mobile terminal 100 may be determined by using an activity stack. For example, the mobile terminal 100 may execute an application B after executing an application A, and then execute an application C. In this case, the application C may be assigned to an uppermost region of the activity stack and the application A may be assigned to a lowermost region of the activity stack. Here, if a control operation of the application C corresponding to a touch input does not exist, and control operations of the applications A and B corresponding to the touch input exist, the mobile terminal 100 may control the application B according to the touch input when the touch input is received.

Figure 24:
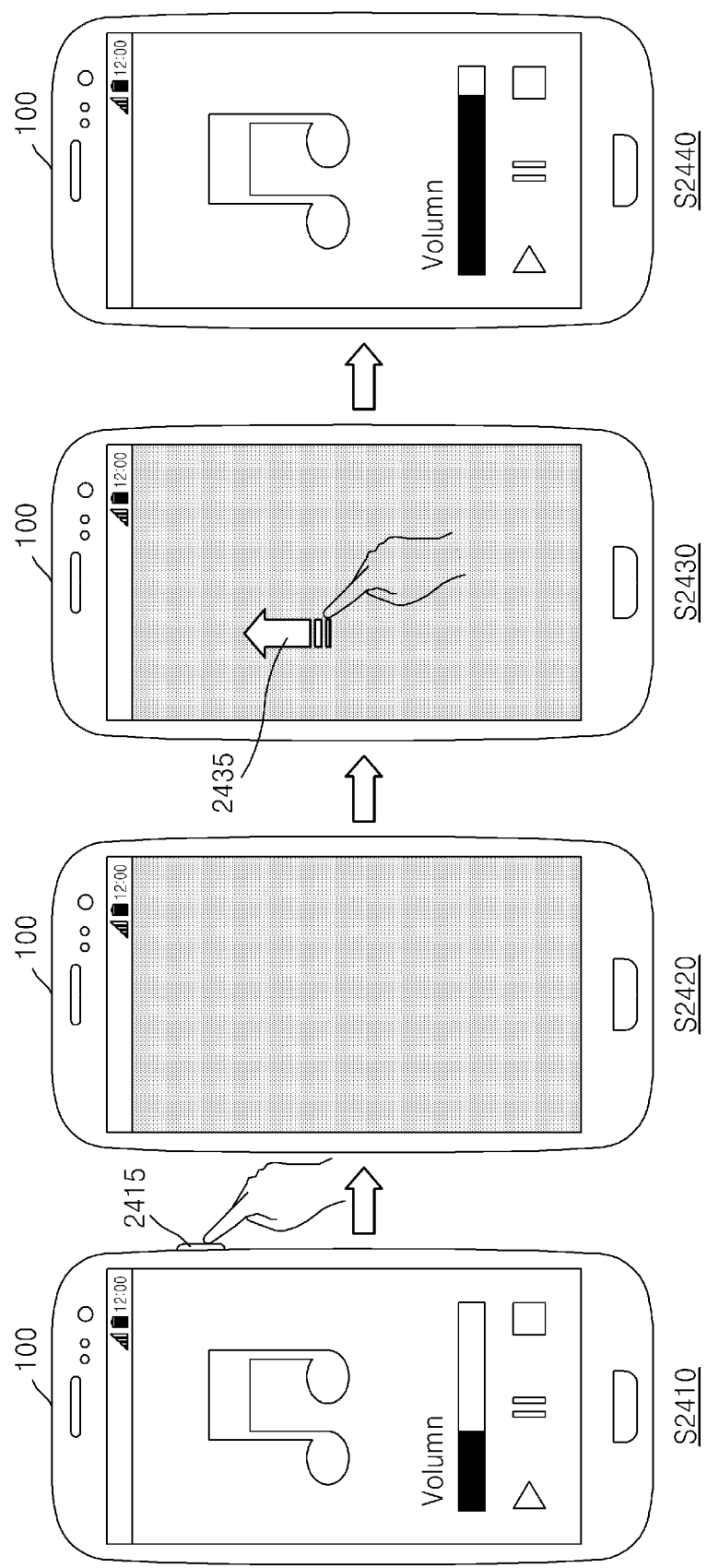
FIG. 24 is a diagram for describing operations of a mobile terminal controlling an application, according to an exemplary embodiment.

FIG. 24 is a diagram for describing operations of the mobile terminal 100 controlling an application, according to an exemplary embodiment.

A sleep mode button may be selected in operation S2410 while the mobile terminal 100 executes an application for reproducing audio content. When the sleep mode button is selected, the mobile terminal 100 may set a sleep mode that deactivates the display of the mobile terminal 100, in operation S2420.

While the sleet mode is set, the mobile terminal 100 may receive a touch input 2435 of dragging in one direction, in operation S2430. Then, the mobile terminal 100 may increase or decrease the volume of the audio content based on the direction of the touch input 2435, in operation S2440.

Figure 25:
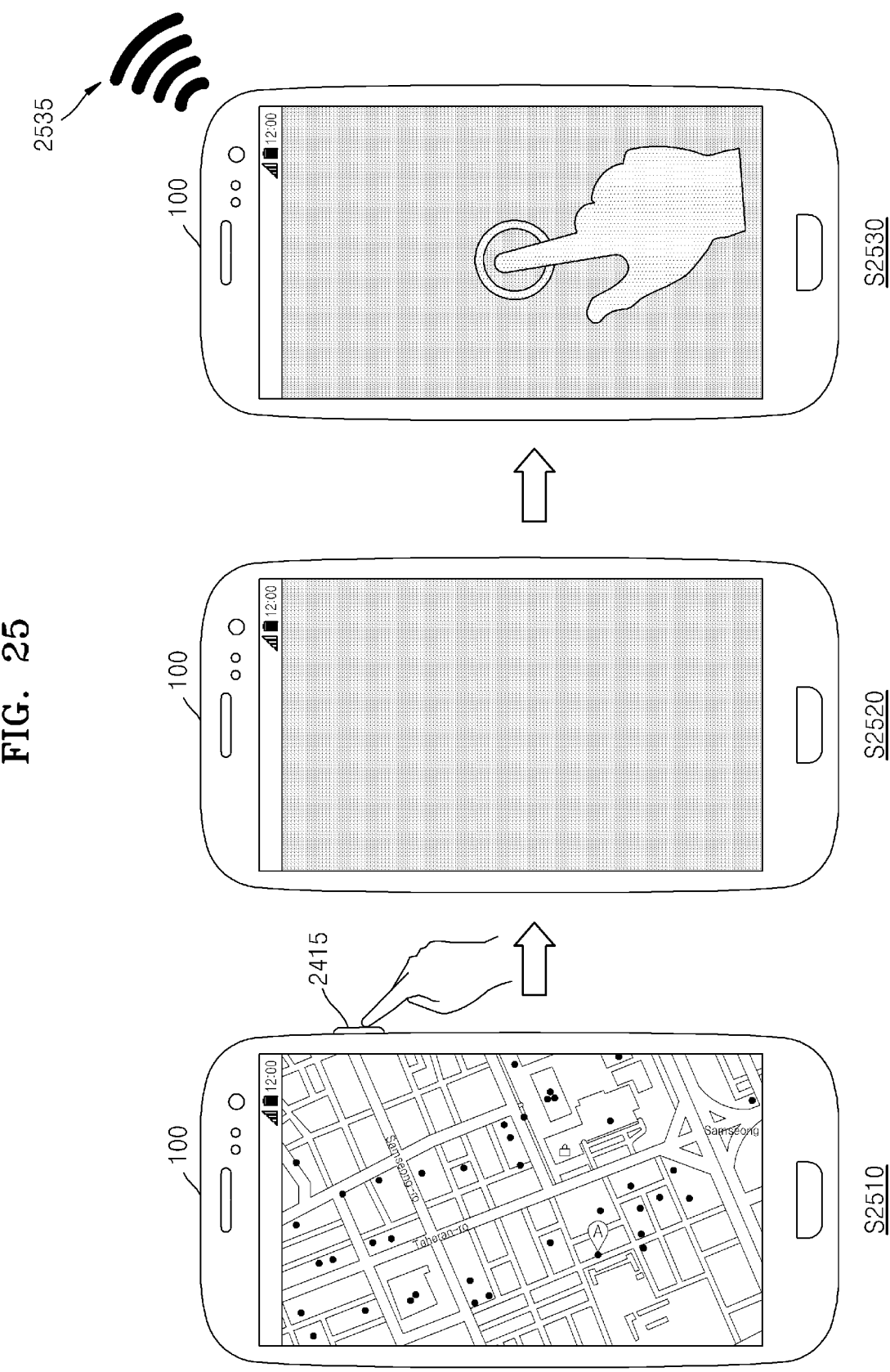
FIG. 25 is a diagram for describing a mobile terminal performing operations according to an application being executed, according to an exemplary embodiment.

FIG. 25 is a diagram for describing the mobile terminal 100 performing operations according to an application being executed, according to an exemplary embodiment.

A sleep mode button may be selected in operation S2510 while the mobile terminal 100 is executing a map-related application. When the sleep mode button is selected, the mobile terminal 100 may set a sleep mode of deactivating the display of the mobile terminal 100 in operation S2520.

When a touch input of a user tapping the touch screen is received during the sleep mode, the mobile terminal 100 may output voice 2535 indicating current location information of the mobile terminal 100 through a speaker of the mobile terminal 100, in operation S2530.

An exemplary embodiment may also be realized in a form of a computer-readable recording medium, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

While the present invention has been particularly shown and described with reference to exemplary embodiments thereof, it will be understood by those of ordinary skill in the art that various changes in form and details may be made therein without departing from the spirit and scope of the present invention as defined by the following claims. Hence, it will be understood that the exemplary embodiments described above are not limiting the scope of the invention. For example, each component described in a single type may be executed in a distributed manner, and components described distributed may also be executed in an integrated form.

The scope of the present invention is indicated by the claims which will be described in the following rather than the detailed description of the invention, and it should be understood that the claims and all modifications or modified forms drawn from the concept of the claims are included in the scope of the present invention.

What is claimed is:

1. A method of operating a mobile terminal comprising a touch sensor and a display, the method comprising:
   receiving a touch input in a state in which the touch sensor is activated and the display is deactivated, the touch input including at least two touches;
   based on a temporal interval between the at least two touches being less than a predetermined time period:
   performing character recognition to identify whether the received touch input is recognizable as at least one character;
   based on the touch input received while the display is deactivated being recognized as the at least one character:
   selecting an application corresponding to the touch input from among a plurality of possible applications that are pre-set in the mobile terminal, the selected application being related to the at least one character;
   receiving a user input to activate the display, wherein the user input to activate the display is different than user input to enter a character, and the user input to activate the display is a user input of pressing a physical button to activate the display; and
   based on receiving the user input to activate the display, executing the selected application corresponding to the touch input, and displaying a result of processing information indicated by the at least one character by using the selected application; and
   based on the temporal interval between the at least two touches being greater than the predetermined time period, or the received touch input not being recognized as the at least one character, determining to not execute the application when the user input to activate the display is received.

2. The method of claim 1, wherein the state in which the display is deactivated comprises:
   a state in which an application processor (AP) of the mobile terminal is deactivated, wherein the executing of the selected application further comprises activating the AP to execute the selected application.

3. The method of claim 1, wherein the executing of the selected application comprises, based on there being an application being executed by an application processor (AP) of the mobile terminal, controlling the selected application based on the touch input.

4. The method of claim 1, further comprising obtaining an inclination about an inclination degree of the mobile terminal,
wherein an operation of the mobile terminal corresponding to the received touch input is determined based on the inclination degree and the received touch input.

5. A mobile terminal comprising:
a touch sensor;
a display;
a physical button; and
a controller configured to:
receive a touch input via the touch sensor in a state in which the touch sensor is activated and the display is deactivated, the touch input including at least two touches;
based on a temporal interval between the at least two touches being less than a predetermined time period:
perform character recognition to identify whether the received touch input is recognizable as at least one character;
based on the touch input received while the display is deactivated being recognized as the at least one character: select an application corresponding to the touch input from among a plurality of possible applications that are pre-set in the mobile terminal, the selected application being related to the at least one character;
receive a user input to activate the display, wherein the user input to activate the display is different than user input to enter a character and the user input to activate the display is a user input of pressing the physical button to activate the display; and
based on receiving the user input to activate the display, execute the selected application corresponding to the touch input, and control the display to display a result of processing information indicated by the at least one character by using the selected application; and
based on the temporal interval between the at least two touches being greater than the predetermined time period, or the received touch input not being recognized as the at least one character, determine to not execute the selected application when the user input to activate the display is received.

6. The mobile terminal of claim 5, wherein the state in which the display is deactivated comprises:
a state in which an application processor (AP) of the mobile terminal is deactivated, wherein the controller is configured to activate the AP to execute the selected application corresponding to the received touch input as the display is activated.

7. The mobile terminal of claim 5, wherein the controller comprises an application processor (AP), and based on there being an application being executed by the AP, the controller controls the selected application based on the received touch input.

8. The mobile terminal of claim 5, wherein the mobile terminal further comprises a tilt sensor for obtaining an inclination about an inclination degree of the mobile terminal, and
an operation of the mobile terminal corresponding to the received touch input is determined based on the inclination degree and the received touch input.

9. A computer-readable recording medium having recorded thereon a program for executing the method of claim 1.

* * * * *